United States Patent
Nishida et al.

(10) Patent No.: US 12,510,186 B2
(45) Date of Patent: Dec. 30, 2025

(54) STEAM VALVE AND POWER GENERATION SYSTEM

(71) Applicant: MITSUBISHI HEAVY INDUSTRIES, LTD., Tokyo (JP)

(72) Inventors: Shingo Nishida, Tokyo (JP); Kazuo Hirota, Tokyo (JP); Fumiyuki Suzuki, Tokyo (JP); Masaki Hata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 57 days.

(21) Appl. No.: 18/292,063

(22) PCT Filed: Dec. 13, 2022

(86) PCT No.: PCT/JP2022/045761
§ 371 (c)(1),
(2) Date: Jan. 25, 2024

(87) PCT Pub. No.: WO2023/149088
PCT Pub. Date: Aug. 10, 2023

(65) Prior Publication Data
US 2024/0328538 A1    Oct. 3, 2024

(30) Foreign Application Priority Data
Feb. 1, 2022   (JP) ................. 2022-014352

(51) Int. Cl.
*F16K 39/02* (2006.01)
*F01K 7/16* (2006.01)
(Continued)

(52) U.S. Cl.
CPC .............. *F16K 39/024* (2013.01); *F01K 7/16* (2013.01); *F01K 13/02* (2013.01); *F16K 1/44* (2013.01);
(Continued)

(58) Field of Classification Search
CPC .... F01D 17/145; F01D 17/10; F05D 2220/31; F05D 2270/3061; F05D 2270/3011;
(Continued)

(56) References Cited

U.S. PATENT DOCUMENTS

| 2017/0022841 A1 | 1/2017 | Nakamura et al. |
| 2019/0178388 A1 | 6/2019 | Hata et al. |

(Continued)

FOREIGN PATENT DOCUMENTS

| JP | S53-105129 U | 8/1978 |
| JP | S60-237101 A | 11/1985 |

(Continued)

OTHER PUBLICATIONS

International Search Report dated Feb. 21, 2023, issued in counterpart Application No. PCT/JP2022/045761. (12 pages).

(Continued)

*Primary Examiner* — Atif H Chaudry
(74) *Attorney, Agent, or Firm* — WHDA, LLP

(57) ABSTRACT

A steam valve according to at least one embodiment of the present disclosure, includes: a valve body that includes a steam flow path through which steam flows, and a valve seat disposed in the middle of the steam flow path and having an opening portion; and a stop valve that includes a valve stem which extends in an axial direction, where an axis extends, and is movable back and forth in the axial direction, and a first valve disc which is fixed to a distal end part of the valve stem and is abutted against the valve seat to close the steam flow path. The valve stem is partitioned into a first valve stem to which the first valve disc is fixed and a second valve stem different from the first valve stem.

11 Claims, 14 Drawing Sheets

(51) Int. Cl.
  *F01K 13/02* (2006.01)
  *F16K 1/44* (2006.01)
(52) U.S. Cl.
  CPC ................ *F05D 2270/3011* (2013.01); *F05D 2270/3061* (2013.01); *F16K 2200/201* (2021.08); *F16K 2200/202* (2021.08); *F16K 2200/204* (2021.08)
(58) Field of Classification Search
  CPC . F01K 13/02; F16K 1/443; F16K 1/44; F16K 2200/201; F16K 2200/202; F16K 2200/204; F16K 39/024
  See application file for complete search history.

(56) References Cited

U.S. PATENT DOCUMENTS

| | | | |
|---|---|---|---|
| 2019/0292934 A1 | 9/2019 | Nakamura et al. | |
| 2019/0383169 A1* | 12/2019 | Onishi | F01D 25/24 |

FOREIGN PATENT DOCUMENTS

| | | |
|---|---|---|
| JP | 2010-121523 A | 6/2010 |
| JP | 2014-070513 A | 4/2014 |
| JP | 2015-200232 A | 11/2015 |
| JP | 2018-131962 A | 8/2018 |
| JP | 2019-100243 A | 6/2019 |
| WO | 2017/200067 A1 | 11/2017 |

OTHER PUBLICATIONS

Notification Concerning Transmittal of International Preliminary Report on Patentability (Forms PCT/IB/326) issued in counterpart International Application No. PCT/JP2022/045761 mailed Aug. 15, 2024, with Forms PCT/IB/373, PCT/IB/338 and PCT/ISA/237. (16 pages).

Office Action dated Aug. 6, 2024, issued in counterpart JP Application No. 2023-578404, with English translation. (14 pages).

* cited by examiner

STEAM VALVE AND POWER GENERATION SYSTEM

TECHNICAL FIELD

The present disclosure relates to a steam valve and a power generation system.

This application claims the priority of Japanese Patent Application No. 2022-014352 filed on Feb. 1, 2022, the content of which is incorporated herein by reference.

BACKGROUND

For example, in a power generation system using a steam turbine, a steam valve is used which is configured to adjust the amount of steam, which is supplied to drive a steam turbine, according to a load change and to stop the steam supply to the steam turbine when an abnormality occurs. The steam valve typically includes a valve seat having an opening portion, a valve stem for moving a valve disc disposed facing the opening portion of the valve seat in a direction toward and away from the valve seat, and a cylindrical support member for slidably supporting the valve stem. In the steam valve having such configuration, it is important to suppress wear caused by rotation, rattling, etc. of the valve disc due to steam.

Patent Document 1 is a structural example of this type of steam valve. This document discloses a steam valve (main steam stop valve) for a steam turbine, where a plane of a valve disc (a plane parallel to the axial direction of a valve stem) and a plane of the valve stem (a plane parallel to the axial direction of the valve stem) are in surface contact with each other in a fitting portion between the valve disc and the valve stem.

CITATION LIST

Patent Literature

Patent Document 1: JP2014-70513A

SUMMARY

Technical Problem

A steam valve may include a stop valve that includes a valve stem, a slave valve disposed at a proximal end of the valve stem, and a master valve (the configuration corresponding to the valve disc disclosed in Patent Document 1) having a through hole through which steam flows when the slave valve is opened. Such a steam valve is configured such that the through hole disposed in the master valve is opened by opening, before the master valve, the slave valve connected to an actuator, thereby reducing a differential pressure between the upstream and downstream sides of the master valve, and an opening operation of the master valve is facilitated.

In the steam valve having the above configuration, from the viewpoint of suppressing wear of the stop valve, it is important to support the master valve so that the master valve does not rotate or rattle with respect to the valve stem in a state where the slave valve and the master valve are open. However, in the valve structure disclosed in Patent Document 1 described above, because of the configuration where the plane of the valve disc and the plane of the valve stem are in surface contact with each other in the fitting portion between the valve disc and the valve stem, it is difficult to support the master valve so that the master valve does not rotate or rattle with respect to the valve stem in a state where the slave valve and the master valve are fully open. Consequently, the stop valve may wear due to the contact of the master valve with the valve stem, in the state where the slave valve and the master valve are fully open.

In view of the above, an object of at least one embodiment of the present disclosure is to provide a steam valve capable of suppressing the wear of the stop valve in a state where the stop valve is fully open, and a power generation system.

Solution to Problem (1) A steam valve according to at least one embodiment of the present disclosure, includes: a valve body that includes a steam flow path through which steam flows, and a valve seat disposed in the middle of the steam flow path and having an opening portion; and a stop valve that includes a valve stem which extends in an axial direction, where an axis extends, and is movable back and forth in the axial direction, and a first valve disc which is fixed to a distal end part of the valve stem and is abutted against the valve seat to close the steam flow path. The valve stem is partitioned into a first valve stem to which the first valve disc is fixed and a second valve stem different from the first valve stem. A partition position of the first valve stem and the second valve stem in the axial direction is located outside a pressure boundary divided from the steam flow path in terms of pressure.

(2) A power generation system according to at least one embodiment of the present disclosure, includes: the steam valve having the above configuration (1); a boiler for generating steam; a steam turbine driven by the steam; and a steam supply pipe for connecting the boiler and the steam turbine and supplying the steam to the steam turbine. The steam valve is disposed in the steam supply pipe.

Advantageous Effects

According to at least one embodiment of the present disclosure, it is possible to suppress wear of a stop valve in a state where the stop valve is fully open.

DETAILED DESCRIPTION

Figure 1:
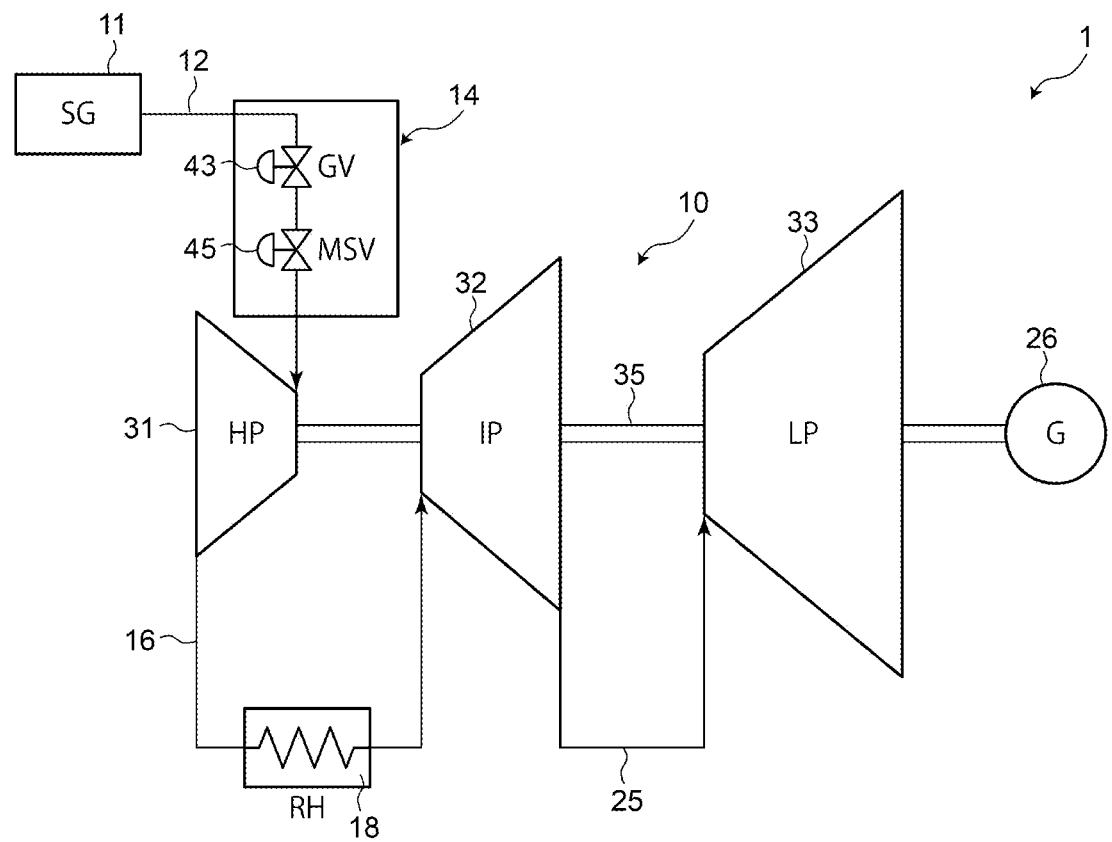
FIG. 1 is a schematic configuration diagram of a power generation system according to an embodiment.

Some embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

(Overall Configuration of Power Generation System)

First, a power generation system 1 to which a steam valve 14 is applied according to at least one embodiment of the present disclosure will be described. FIG. 1 is a schematic configuration diagram of the power generation system 1 according to an embodiment. The power generation system 1 includes a steam turbine 10, a boiler 11, and a generator 26.

The steam turbine 10 is a turbine driven by steam generated in the boiler 11. The steam turbine 10 is connected to the boiler 11 via a first steam supply pipe 12 and is driven by being supplied with high-pressure steam generated by burning fuel in the boiler 11. The first steam supply pipe 12 is provided with the steam valve 14 for controlling the flow rate of the steam supplied to the steam turbine 10. The steam valve 14 includes a control valve 43 and a stop valve 45, and the configuration of the steam valve 14 will be described in detail later.

In the present embodiment, a multi-stage turbine is exemplified as the steam turbine 10, and the steam turbine 10 includes a high-pressure steam turbine 31, an intermediate-pressure steam turbine 32, and a low-pressure steam turbine 33 from an upstream side with respect to a steam flow path. The high-pressure steam turbine 31 is driven by the steam supplied from the first steam supply pipe 12 (the high-pressure steam generated in the boiler 11). The steam having finished work in the high-pressure steam turbine 31 is supplied to the intermediate-pressure steam turbine 32 via a second steam supply pipe 16. The second steam supply pipe 16 is provided with a reheater 18.

The intermediate-pressure steam turbine 32 is driven by the steam supplied from the second steam supply pipe 16 (the steam having finished work in the high-pressure steam turbine 31). The steam having finished work in the intermediate-pressure steam turbine 32 is supplied to the low-pressure steam turbine 33 via a third steam supply pipe 25. The low-pressure steam turbine 33 is driven by the steam supplied from the third steam supply pipe 25 (the steam having finished work in the intermediate-pressure steam turbine 32).

The respective turbines (the high-pressure steam turbine 31, the intermediate-pressure steam turbine 32, and the low-pressure steam turbine 33) constituting the steam turbine 10 include a common rotational shaft 35. The rotational shaft 35 is coupled to the generator 26, and the generator 26 is driven by rotating the respective turbines, thereby generating power.

Configuration of Steam Valve 14 According to First Embodiment

Figure 2:
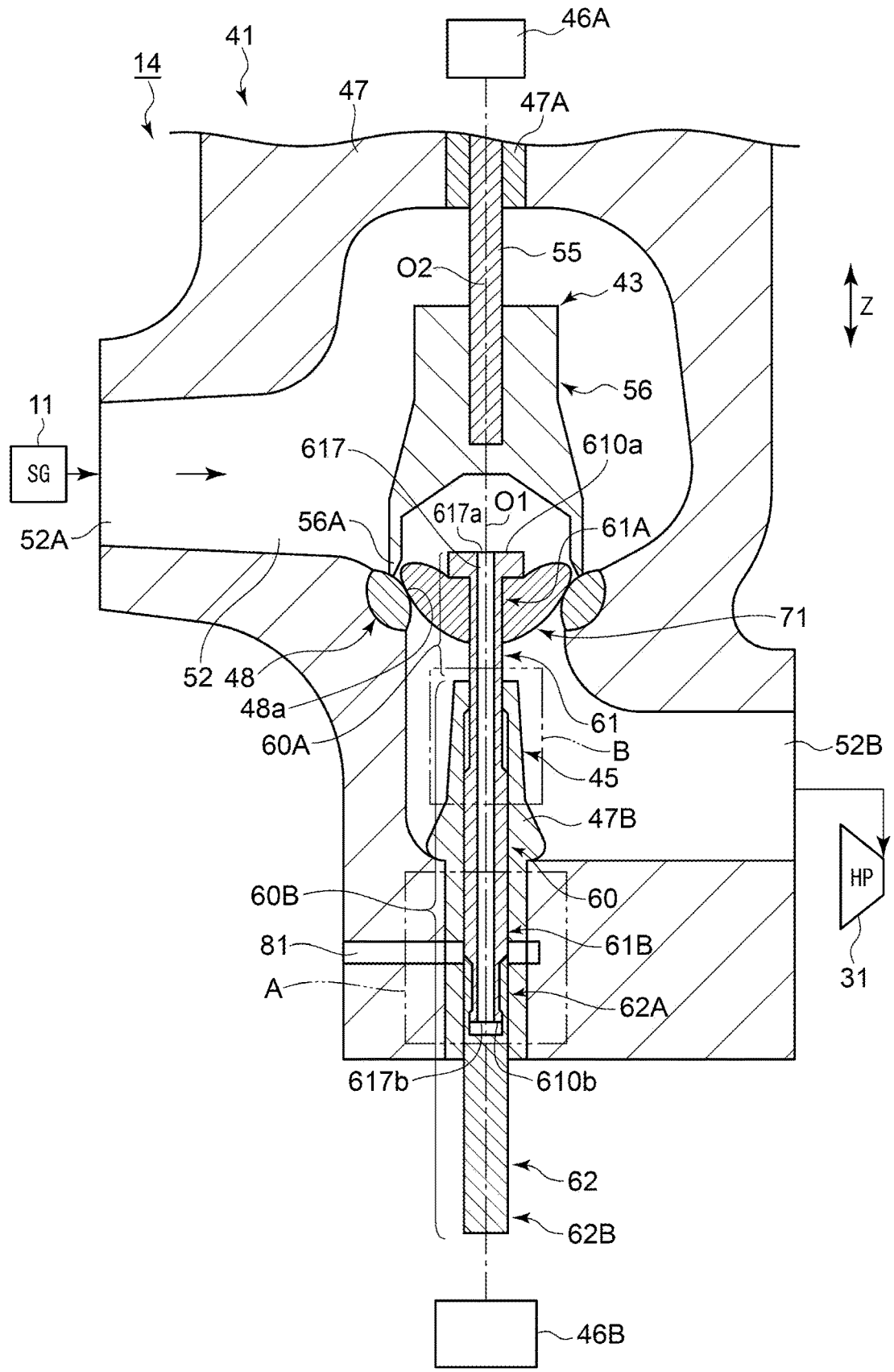
FIG. 2 is a cross-sectional view showing the configuration of a steam valve in a state where a first valve disc is closed according to the first embodiment.
Figure 3A:
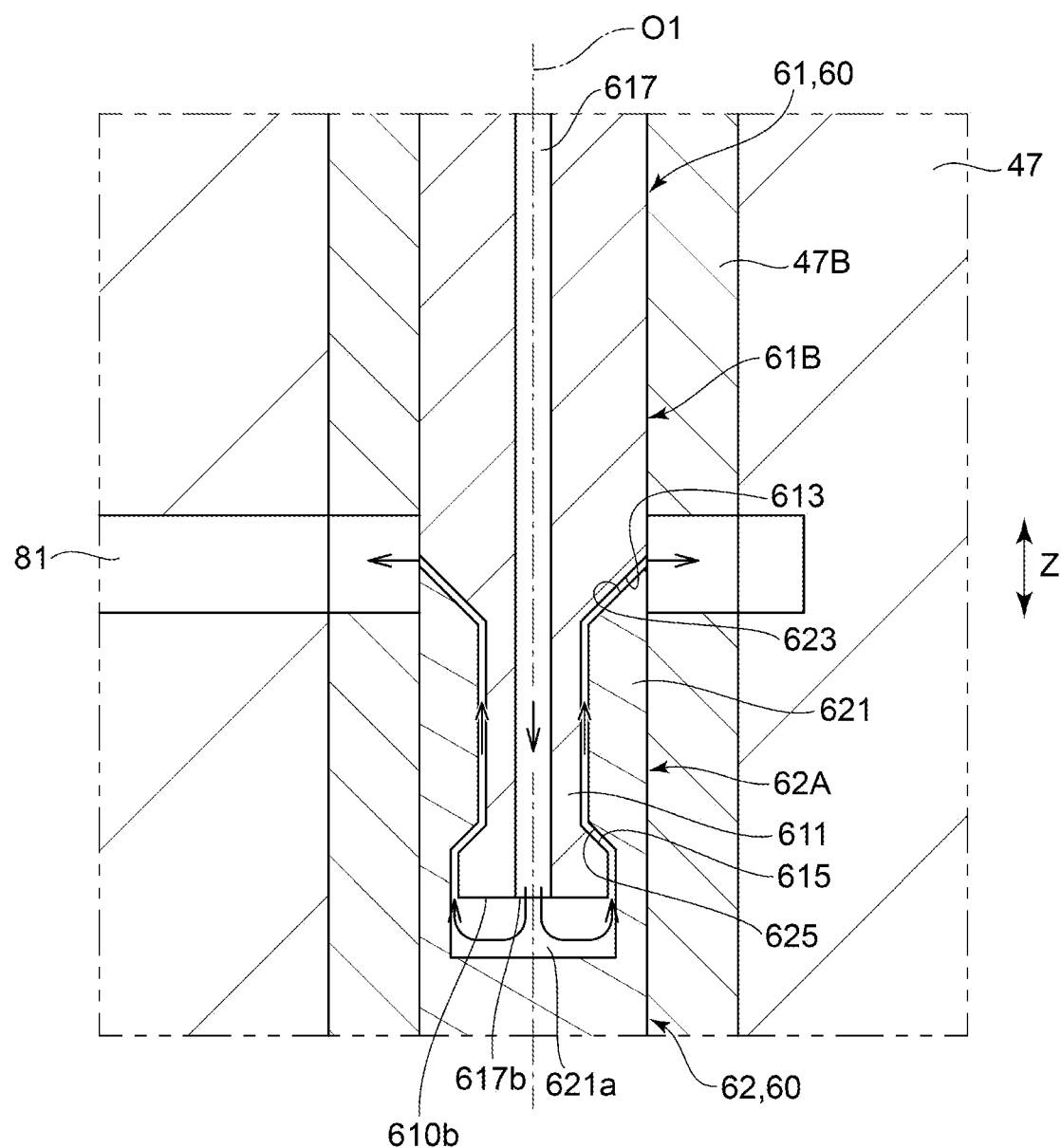
FIG. 3A is an enlarged view of a region A in FIG. 2.
Figure 3B:
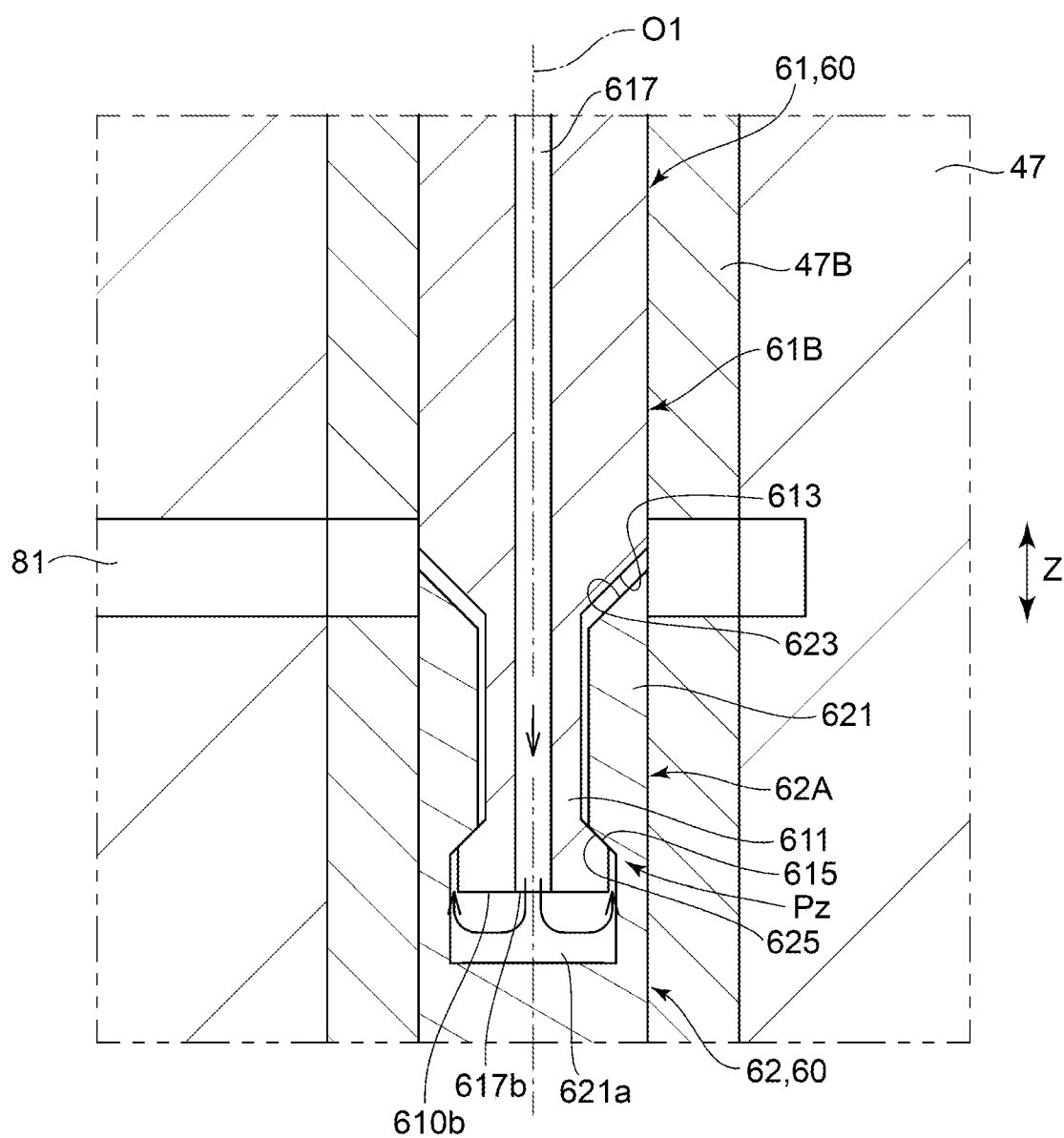
FIG. 3B is an enlarged view of the region A in FIG. 2.
Figure 3C:
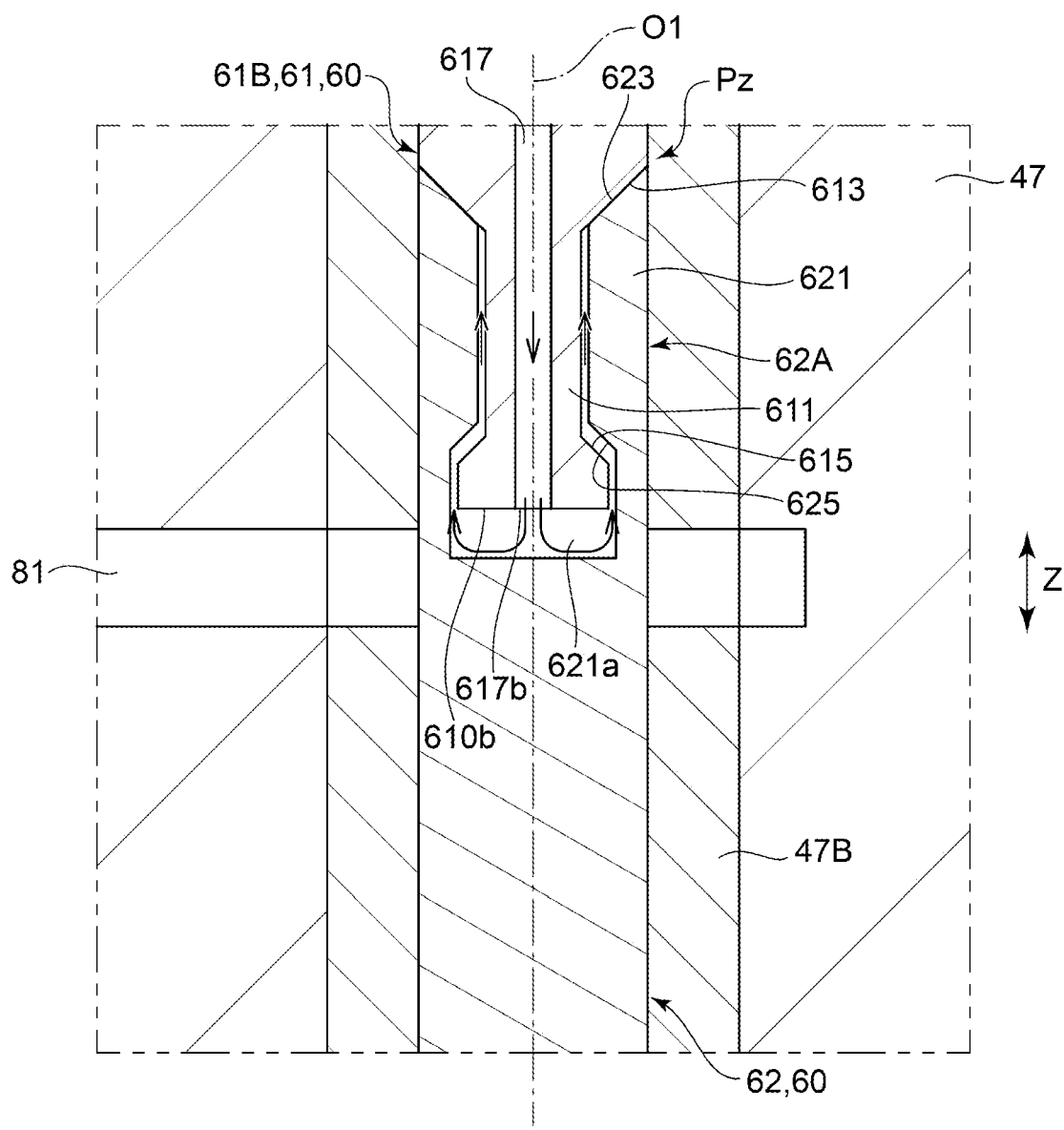
FIG. 3C is an enlarged view of the region A in FIG. 2.
Figure 4A:
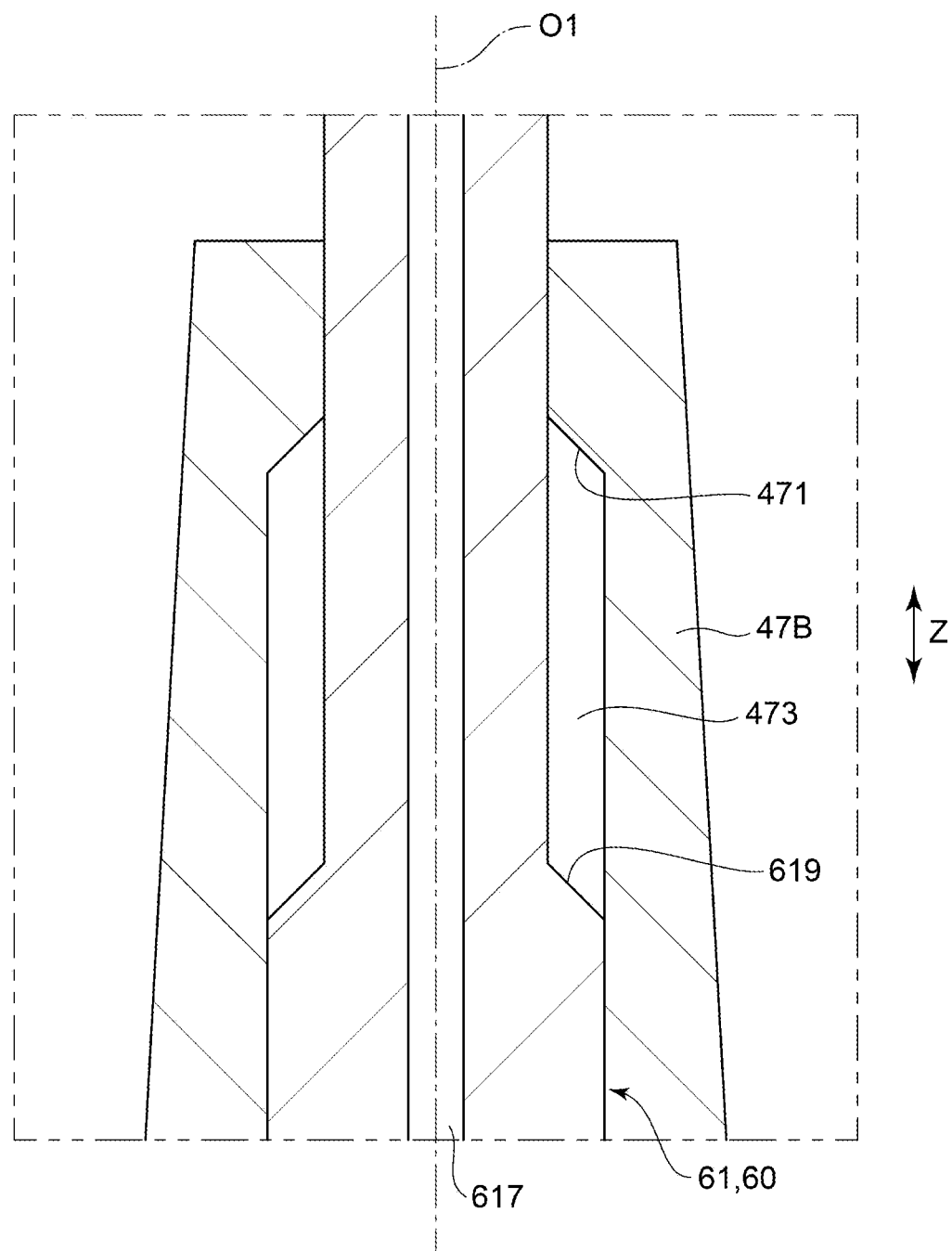
FIG. 4A is an enlarged view of a region B in FIG. 2.
Figure 4B:
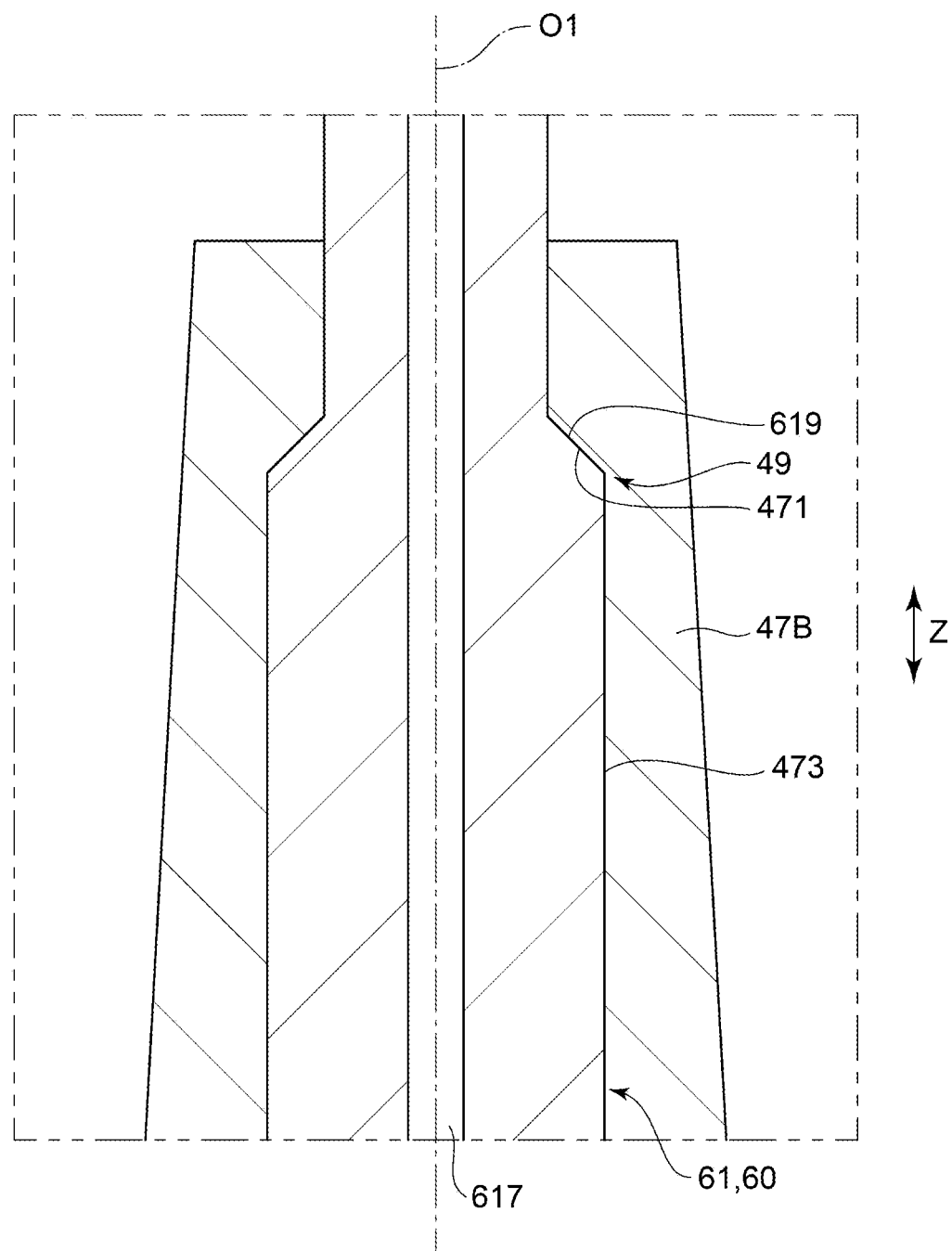
FIG. 4B is an enlarged view of the region B in FIG. 2.

Next, the configuration of the steam valve 14 according to the first embodiment will be described with reference to FIGS. 2 to 4B. FIG. 2 is a cross-sectional view showing the configuration of the steam valve 14 in a state where a first valve disc 71 is closed according to the first embodiment. FIGS. 3A, 3B, and 3C are each an enlarged view of a region A in FIG. 2. FIGS. 4A and 4B are each an enlarged view of a region B in FIG. 2. FIG. 3A shows a state when the stop valve 45 starts to open from when the stop valve 45 is fully closed, FIGS. 3B and 4A show a state when the stop valve 45 is fully closed, and FIGS. 3C and 4B show a state when the stop valve 45 is fully open.

In FIGS. 2 to 4B and FIGS. 5 to 8B for the steam valve 14 according to the second embodiment which will be described later, O1 is an axis of a valve stem 60 forming the stop valve 45, and O2 is an axis of a valve stem 55 forming the control valve 43. An extension direction of the axis O1, O2 (hereinafter referred to as an "axial direction Z") is, for example, a substantially vertical direction.

As shown in FIG. 2, the steam valve 14 according to the first embodiment includes a valve body 41, the control valve 43, the stop valve 45, and actuators 46A, 46B. The valve body 41 includes a flow path dividing part 47 and a valve seat 48. The flow path dividing part 47 divides a steam flow path 52, and accommodates a portion (distal end side) of the control valve 43 and a portion (distal end side) of the stop valve 45. The steam flow path 52 has an inlet section 52A and an outlet section 52B. The inlet section 52A is connected to the boiler 11 via one side of the first steam supply pipe 12, and the high-pressure steam generated in the boiler 11 is introduced to the inlet section 52A. The outlet section 52B is connected to the high-pressure steam turbine 31 via another side of the first steam supply pipe 12. The amount of the steam supplied from the boiler 11 to the high-pressure steam turbine 31 via the first steam supply pipe 12 can be adjusted by controlling the opening degree of the control valve 43 in the state where the stop valve 45 is open, in the steam valve 14 disposed in the first steam supply pipe 12.

The flow path dividing part 47 includes a first guide member 47A and a second guide member 47B. The first guide member 47A is disposed so as to cover an outer peripheral surface of a portion, of the valve stem 55 forming the control valve 43, which is not exposed to the steam flow path 52. The first guide member 47A functions as a guide for guiding the valve stem 55 in the axial direction Z. The second guide member 47B is disposed so as to cover an outer peripheral surface of a rod-shaped part 60B forming the stop valve 45. The second guide member 47B functions as a guide for guiding the valve stem 60 in the axial direction Z. In the steam valve 14 according to the first embodiment, the second guide member 47B protrudes into the steam flow path 52.

The valve seat 48 is disposed in the flow path dividing part 47 located in the middle of the steam flow path 52. The valve seat 48 has a ring shape centered on the axis O1, and is configured such that the axis of the valve seat 48 coincides with the axis O1. That is, the valve seat 48 has an opening portion centered on the axis O1. The valve seat 48 has a valve seat surface 48a exposed to the steam flow path 52. The valve seat surface 48a is, for example, a curved surface. The first valve disc 71 forming the stop valve 45 and a distal end 56A of a control valve body 56 forming the control valve 43 can abut against the valve seat surface 48a.

(Control Valve 43)

The control valve 43 is disposed upstream of a position where the stop valve 45 is disposed, in a steam flow direction. The control valve 43 includes the valve stem 55 and the control valve body 56. The valve stem 55 extends in the axial direction Z, and a distal end side of the valve stem 55 is disposed in the steam flow path 52. The axis O1 of the valve stem 55 is configured to coincide with the axis O2 of the valve stem 55 of the stop valve 45. The valve stem 55 is movable in the axial direction Z.

The control valve body 56 is disposed on the distal end side of the valve stem 55. A portion of the control valve body 56 located on the valve seat 48 side has a tubular shape and has the distal end 56A that can abut against the valve seat surface 48a of the valve seat 48. The control valve 43 having such configuration controls an interval between the valve seat 48 and the distal end 56A of the control valve body 56 by moving the valve stem 55 along the axial direction Z with the actuator 46A, thereby having a function of controlling, according to a load of the steam turbine 10, the flow rate of high-pressure steam supplied to the high-pressure steam turbine 31.

(Stop Valve 45)

The stop valve 45 is disposed on an inner side of the control valve 43. The stop valve 45 includes the valve stem 60 and the first valve disc 71.

(Valve Stem 60)

The valve stem 60 extends in the axial direction Z, and has a distal end part 61A and a rod-shaped part 60B on a proximal end side relative to the distal end part 60A. The distal end part 61A has a shape that can engage with the first valve disc 71, for fixing the first valve disc 71. The rod-shaped part 60B extends along the axial direction Z. The rod-shaped part 60B has a proximal end portion connected to the actuator 46B. The valve stem 60 thus having the distal end part 61A and the rod-shaped part 60B is partitioned into the first valve stem 61 and the second valve stem 62 as will be described in detail later, and the first valve stem 61 and the second valve stem 62 are movable back and forth in the axial direction Z.

In the following description, of the axial direction Z, an upper side in FIG. 2 will be referred to as the distal end side and a lower side in FIG. 2 will be referred to as the proximal end side.

In the steam valve 14 according to the first embodiment, the first valve stem 61 is located on the distal end side of the valve stem 60 partitioned into two parts, and the first valve disc 71 is fixed to the distal end part 61A.

In the steam valve 14 according to the first embodiment, the second valve stem 62 is located on the proximal end side of the valve stem 60 partitioned into two parts, and the actuator 46B is fixed to a proximal end part 62B.

As is well shown in FIGS. 3A to 3C, the proximal end part 61B of the first valve stem 61 is connected to the distal end part 62A of the second valve stem 62.

The proximal end part 61B of the first valve stem 61 and the distal end part 62A of the second valve stem 62 overlap in the axial direction Z. In the steam valve 14 according to the first embodiment, the proximal end part 61B of the first valve stem 61 has a small diameter section 611 formed such that an outer diameter is smaller in a region near the end portion on the proximal end side than in a region on the distal end side relative to said region. Further, in the steam valve 14 according to the first embodiment, the proximal end part 62B of the second valve stem 62 has a tubular section 621 formed into a tubular shape so as to surround an outer periphery of the small diameter section 611 of the first valve stem 61.

In the steam valve 14 according to the first embodiment, the small diameter section 611 of the first valve stem 61 and the tubular section 621 of the second valve stem 62 are configured to relatively be movable in the axial direction Z. Further, a clearance is provided between an outer peripheral surface of the small diameter section 611 of the first valve stem 61 and an inner peripheral surface of the tubular section 621 of the second valve stem 62, allowing the steam in the steam flow path 52 to flow through as described later.

In the steam valve 14 according to the first embodiment, the first valve stem 61 has a first valve-open-time pressing surface 613 pressed in the axial direction Z with the second valve stem 62 when the second valve stem 62 moves from the proximal end side toward the distal end side of the valve stem 60.

In the steam valve 14 according to the first embodiment, the second valve stem 62 has a second valve-open-time pressing surface 623 pressing the first valve-open-time pressing surface 613 in the axial direction Z when the second valve stem 62 moves from the proximal end side toward the distal end side of the valve stem 60.

In the steam valve 14 according to the first embodiment, the first valve-open-time pressing surface 613 is a conical inclined surface which is formed at a position ranging from the small diameter section 611 to a region on the distal end side relative to the small diameter section 611 and, for example, expands an outer diameter of the first valve stem 61 from the proximal end side toward the distal end side of the valve stem 60.

In the steam valve 14 according to the first embodiment, the second valve-open-time pressing surface 623 is a conical inclined surface which is formed at a distal end of the tubular section 621 and, for example, expands an inner diameter of an inner peripheral surface of the tubular section 621 from the proximal end side toward the distal end side of the valve stem 60.

The first valve-open-time pressing surface 613 and the second valve-open-time pressing surface 623 are formed to be abuttable against each other without any gap. The first valve-open-time pressing surface 613 and the second valve-open-time pressing surface 623 may each be a spherical inclined surface instead of the conical inclined surface.

In the steam valve 14 according to the first embodiment, the first valve stem 61 has a first valve-close-time pressing surface 615 pressed in the axial direction Z with the second valve stem 62 when the stop valve 45 is fully closed. The second valve stem 62 has a second valve-close-time pressing surface 625 pressing the first valve-close-time pressing surface 615 in the axial direction Z when the stop valve 45 is fully closed.

In the steam valve 14 according to the first embodiment, the first valve-close-time pressing surface 615 is a conical inclined surface which is formed at an end portion of the small diameter section 611 on the proximal end side and, for example, expands the outer diameter of the first valve stem 61 (small diameter section 611) from the distal end side toward the proximal end side of the valve stem 60.

In the steam valve 14 according to the first embodiment, the second valve-close-time pressing surface 625 is a conical inclined surface which is formed on the proximal end side of the tubular section 621 and, for example, expands the inner diameter of the inner peripheral surface of the tubular section 621 from the distal end side toward the proximal end side of the valve stem 60.

The first valve-close-time pressing surface 615 and the second valve-close-time pressing surface 625 are formed to be abuttable against each other without any gap. The first valve-close-time pressing surface 615 and the second valve-close-time pressing surface 625 may each be a spherical inclined surface instead of the conical inclined surface.

In the steam valve 14 according to the first embodiment, a partition position Pz of the first valve stem 61 and the second valve stem 62 in the axial direction Z is an abutment position of the first valve-open-time pressing surface 613 and the second valve-open-time pressing surface 623 or an abutment position of the first valve-close-time pressing surface 615 and the second valve-close-time pressing surface 625.

For example, in a case where the second valve stem 62 is driven toward the distal end side by the actuator 46B and the second valve stem 62 presses the first valve stem 61 toward the distal end side or in the state when the stop valve 45 is fully open as shown in FIG. 3C, the first valve stem 61 and the second valve stem 62 move relatively in the axial direction Z so as to approach each other, the first valve-open-time pressing surface 613 and the second valve-open-time pressing surface 613 abut against and closely contact each other, and the first valve-close-time pressing surface 615 and the second valve-close-time pressing surface 625 are separated from each other.

For example, in a case where the second valve stem 62 is driven toward the proximal end side by the actuator 46B and the second valve stem 62 pulls the first valve stem 61 toward the proximal end side or in the state when the stop valve 45 is fully closed as shown in FIG. 3B, the first valve stem 61 and the second valve stem 62 move relatively in the axial direction Z so as to get farther away from each other, the first valve-open-time pressing surface 613 and the second valve-open-time pressing surface 613 are separated from each other, and the first valve-close-time pressing surface 615 and the second valve-close-time pressing surface 625 abut against and closely contact each other.

For example, in a case where the second valve stem 62 starts to be driven toward the distal end side by the actuator 46B from the state when the stop valve 45 is fully closed, as shown in FIG. 3A, the first valve-open-time pressing surface 613 and the second valve-open-time pressing surface 613 are separated from each other, and the first valve-close-time pressing surface 615 and the second valve-close-time pressing surface 625 are separated from each other.

(Through Hole 617 of First Valve Stem 61)

In the steam valve 14 according to the first embodiment, the first valve stem 61 has a through hole 617 penetrating from a distal end 610a to a proximal end 610b of the first valve stem 61. An end opening 617a of the through hole 617 on the distal end side faces the steam flow path 52 on the upstream side of the stop valve 45. An end opening 617b of the through hole 617 on the proximal end side faces an inner peripheral portion 621a of the tubular section 621 of the second valve stem 62.

(First Inclined Surface 619 of First Valve Stem 61)

As shown in FIGS. 4A and 4B, in the steam valve 14 according to the first embodiment, the first valve stem 61 has a first inclined surface 619 which expands an outer diameter of the valve stem 60 (first valve stem 61) from the distal end side toward the proximal end side of the valve stem 61, on the distal end side in a region where the outer peripheral surface is covered with the second guide member 47B. The first inclined surface 619 is a conical inclined surface.

In the steam valve 14 according to the first embodiment, the second guide member 47B has a first abutment surface 471 abutting against the first inclined surface 619 of the first valve stem 61 when the stop valve 45 is fully open as shown in FIG. 4B. The first abutment surface 471 is a conical inclined surface formed so as to expand an inner diameter of the first abutment surface 471 from the distal end side toward the proximal end side.

The first inclined surface 619 and the first abutment surface 471 are formed to be abuttable against each other without any gap. The first inclined surface 619 and the first abutment surface 471 may each be a spherical inclined surface instead of the conical inclined surface.

Regarding Operation of Stop Valve 45 of Steam Valve 14 According to First Embodiment In the steam valve 14 according to the first embodiment, the stop valve 45 operates as follows.

In the steam valve 14, the stop valve 45 is opened before the control valve 43 is opened when the flow rate of steam is controlled by the control valve 43.

(When Fully Closed)

When the stop valve 45 is fully closed as shown in FIG. 2, the first valve disc 71 abuts against the valve seat surface 48a of the valve seat 48. Therefore, the first valve stem 61 to which the first valve disc 71 is fixed is restricted from moving toward the proximal end side. The second valve stem 62 is biased toward the proximal end side by a biasing force of a closing spring (not shown). Consequently, the first valve stem 61 and the second valve stem 62 move relatively in the axial direction Z so as to get farther away from each other, the first valve-open-time pressing surface 613 and the second valve-open-time pressing surface 613 are separated from each other as shown in FIG. 3B, and the first valve-close-time pressing surface 615 and the second valve-close-time pressing surface 625 abut against and closely contact each other.

Since the end opening 617a of the through hole 617 on the distal end side faces the steam flow path 52 as described above, the steam in the steam flow path 52 on the upstream side of the first valve disc 71 can flow into the inner peripheral portion 621a of the tubular section 621 of the second valve stem 62 from the end opening 617b on the proximal end side via the through hole 617. However, since the first valve-close time pressing surface 615 and the second valve-close time pressing surface 625 abut against and closely contact each other as described above when the stop valve 45 is fully closed, steam does not flow out to the distal end side relative to the first valve-close time pressing surface 615 and the second valve-close time pressing surface 625.

(Case where Stop Valve 45 Starts to Open from Fully Closed State)

In a case where the second valve stem 62 starts to be driven toward the distal end side by the actuator 46B from the fully closed state of the stop valve 45 shown in FIGS. 2, 3B, and 4A, as shown in FIG. 3A, the first valve-open-time pressing surface 613 and the second valve-open-time pressing surface 613 are separated from each other, and the first valve-close-time pressing surface 615 and the second valve-close-time pressing surface 625 are separated from each other. Consequently, the steam having flowed into the inner peripheral portion 621a of the tubular section 621 of the second valve stem 62 via the through hole 617 is led out to, for example, a high-pressure stem leak system 81 via the clearance between the small diameter section 611 of the first valve stem 61 and the inner peripheral surface of the tubular section 621 of the second valve stem 62 and the clearance between the first valve-open-time pressing surface 613 and the second valve-open-time pressing surface 623. Whereby, a differential pressure between the upstream and downstream sides of the first valve disc 71 is reduced, facilitating a subsequent opening operation of the first valve disc 71.

(From Start of Opening to Fully Open State of Stop Valve 45)

If the second valve stem 62 is further driven toward the distal end side by the actuator 46B from the above-described state where the stop valve 45 starts to open, the first valve-open-time pressing surface 613 and the second valve-open-time pressing surface 623 abut against each other as shown in FIG. 3C. Therefore, if the second valve stem 62 is further driven toward the distal end side by the actuator 46B, the first valve stem 61 is driven toward the distal end side by a driving force of the actuator 46B transmitted via the second valve stem 62. Consequently, the first valve disc 71 fixed to the first valve stem 61 moves to the distal end side and leaves the valve seat surface 48a of the valve seat 48.

(When Fully Open)

If the second valve stem 62 is further driven toward the distal end side by the actuator 46B, the stop valve 45 enters the fully open state.

In the fully open state of the stop valve 45, the first inclined surface 619 of the first valve stem 61 abuts against the first abutment surface 471 of the second guide member 47B without any gap as shown in FIG. 4B. Consequently, the first valve stem 61 and the first valve disc 71 are restricted from moving to the distal end side. Further, the first valve stem 61 is biased to the distal end side by the driving force of the actuator 46B. Therefore, the first inclined surface 619 and the first abutment surface 471 are brought into pressure-contact with each other in the state where the first inclined surface 619 and the first abutment surface 471 abut against each other without any gap. Consequently, a pressure boundary 49 is formed by the first inclined surface 619 and the first abutment surface 471. The pressure boundary 49 divides the steam flow path 52 from an inner peripheral portion 473 of the second guide member 47B in terms of pressure.

(During Closing Operation)

In a case where the stop valve 45 is closed, if the second valve stem 62 is driven toward the proximal end side by the actuator 46B, the first valve stem 61 and the second valve stem 62 move relatively in the axial direction Z so as to get farther away from each other, the first valve-open-time pressing surface 613 and the second valve-open-time pressing surface 613 are separated from each other, and the first valve-close-time pressing surface 615 and the second valve-close-time pressing surface 625 abut against each other.

Therefore, if the second valve stem 62 is further driven toward the proximal end side by the actuator 46B, the first valve stem 61 and the first valve disc 71 start to move toward the proximal end side.

Hereinafter, the first valve stem 61 and the first valve disc 71 move toward the proximal end side until the first valve disc 71 abuts against the valve seat surface 48a of the valve seat 48.

Thus, in the steam valve 14 according to the first embodiment, the partition position Pz of the first valve stem 61 and the second valve stem 62 in the axial direction Z is located outside the pressure boundary 49 divided from the steam flow path 52 in terms of pressure.

In the steam valve 14 according to the first embodiment, wear does not occur between the first valve disc 71 and the first valve stem 61 since the first valve disc 71 is fixed to the first valve stem 61, and the partition position Pz of the first valve stem 61 and the second valve stem 62 in the axial direction is not exposed to the steam flow path 52, where high-pressure steam may flow at high speed, since the partition position Pz is located outside the pressure boundary 49, effectively suppressing wear at the partition position Pz.

In the steam valve 14 according to the first embodiment, the pressure boundary 49 is formed by the first inclined surface 619 and the first abutment surface 471.

Whereby, the pressure boundary 49 can be formed by using the configuration for limiting the movement range of the valve stem 60 toward the distal end side, making it possible to simplify the configuration of the steam valve 14.

In the steam valve 14 according to the first embodiment, the first abutment surface 471 is formed in the second guide member 47B which is a cylindrical support member for slidably supporting the valve stem 60.

Whereby, the pressure boundary 49 can be formed by the second guide member 47B which is the support member for the valve stem and the valve stem 60 (first valve stem 61).

In the steam valve 14 according to the first embodiment, the first valve stem 61 has the first valve-open-time pressing surface 613 and the second valve stem 62 has the second valve-open-time pressing surface 623.

Whereby, even if the valve stem 60 is partitioned into the first valve stem 61 and the second valve stem 62, the second valve stem 62 can move the first valve stem 61 from the proximal end side toward the distal end side of the valve stem 60.

In the steam valve 14 according to the first embodiment, the first valve stem 61 is interposed between the first abutment surface 471 of the second guide member 47B and the second valve-open-time pressing surface 623 of the second valve stem 62 and is fixed to the second guide member 47B when the stop valve 45 is fully open.

Consequently, the first valve stem 61 and the first valve disc 71 fixed to the first valve stem 61 are fixed to the second guide member 47B when the stop valve 45 is fully open, making it possible to suppress vibrations of the first valve stem 61 and the first valve disc 71. Further, since the first valve stem 61 is fixed to the second guide member 47B, it is possible to effectively suppress wear at the contact area of the first valve stem 61 and the second guide member 47B.

In the steam valve 14 according to the first embodiment, when the stop valve 45 is fully open, the first valve-open-time pressing surface 613 and the second valve-open-time pressing surface 623 abut against each other, making it possible to prohibit the steam in the steam flow path 52 from flowing out to the outside via the through hole 617.

In the steam valve 14 according to the first embodiment, the first valve stem 61 has the first valve-close-time pressing surface 615 and the second valve stem 62 has the second valve-close-time pressing surface 625.

Whereby, even if the valve stem 60 is partitioned into the first valve stem 61 and the second valve stem 62, the second valve stem 62 can move the first valve stem 61 from the distal end side toward the proximal end side of the valve stem 60.

In the steam valve 14 according to the first embodiment, when the stop valve 45 is fully closed, the first valve-close-time pressing surface 615 and the second valve-close-time pressing surface 625 abut against and closely contact each other, making it possible to prohibit the steam in the steam flow path 52 from flowing out to the outside via the through hole 617.

In the steam valve 14 according to the first embodiment, when the stop valve 45 starts to open from when the stop valve 45 is fully closed, the first valve-close-time pressing surface 615 and the second valve-close-time pressing surface 625 are separated from each other and the first valve-open-time pressing surface 613 and the second valve-open-time pressing surface 623 are separated from each other, permitting the steam in the steam flow path 52 to flow out to the outside via the through hole 617.

Whereby, the pressure of the steam acting on the stop valve 45 can be reduced by releasing the steam acting on the stop valve 45 to the outside via the through hole 617, when the stop valve 45 starts to open from when the stop valve 45 is fully closed. That is, the differential pressure between the upstream and downstream sides of the first valve disc 71 is reduced, facilitating the opening operation of the first valve disc 71.

Configuration of Steam Valve 14 According to Second Embodiment

Figure 5:
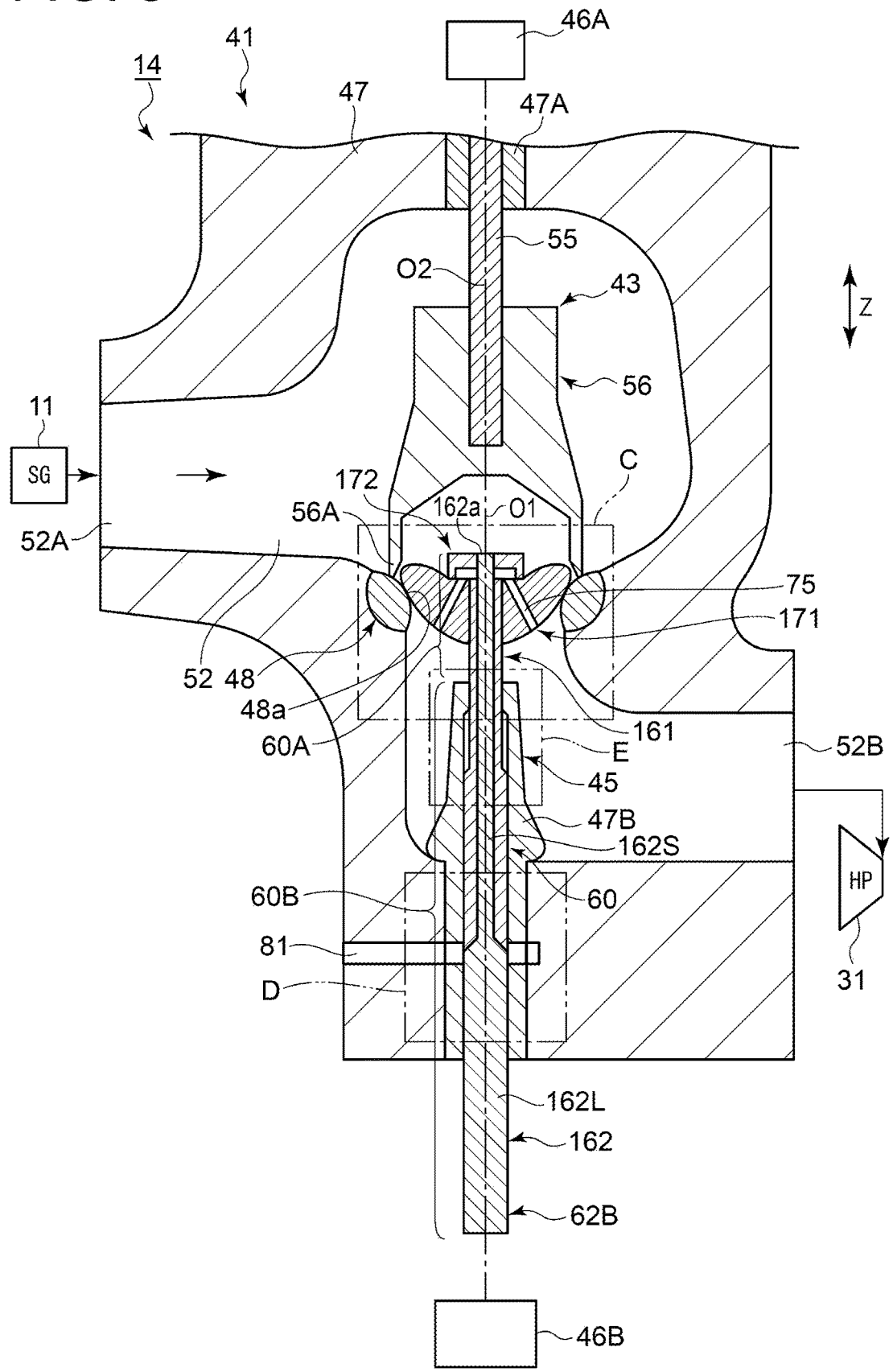
FIG. 5 is a cross-sectional view showing the configuration of the steam valve in a state where both a first valve disc and a second valve disc are closed according to the second embodiment.
Figure 6A:
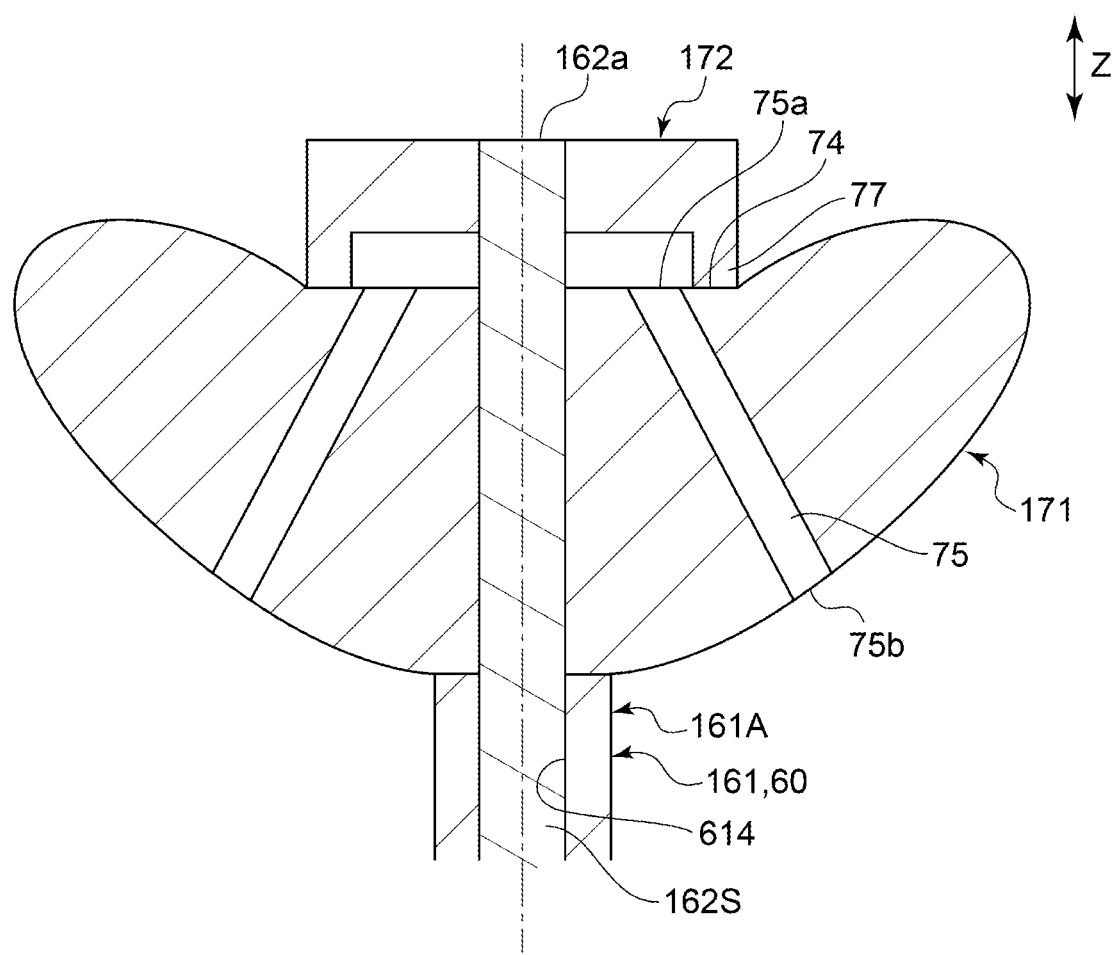
FIG. 6A is an enlarged view of a region C in FIG. 5.
Figure 6B:
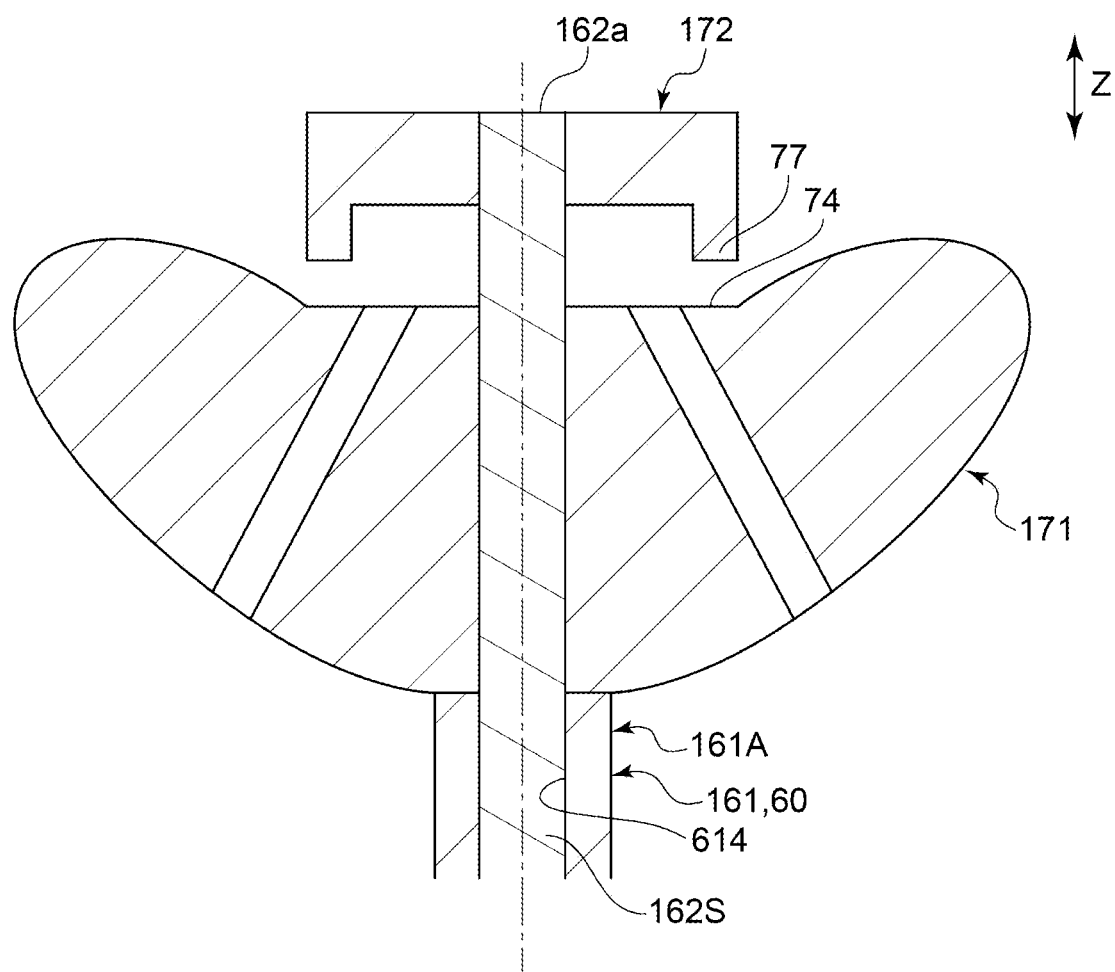
FIG. 6B is an enlarged view of the region C in FIG. 5.
Figure 7A:
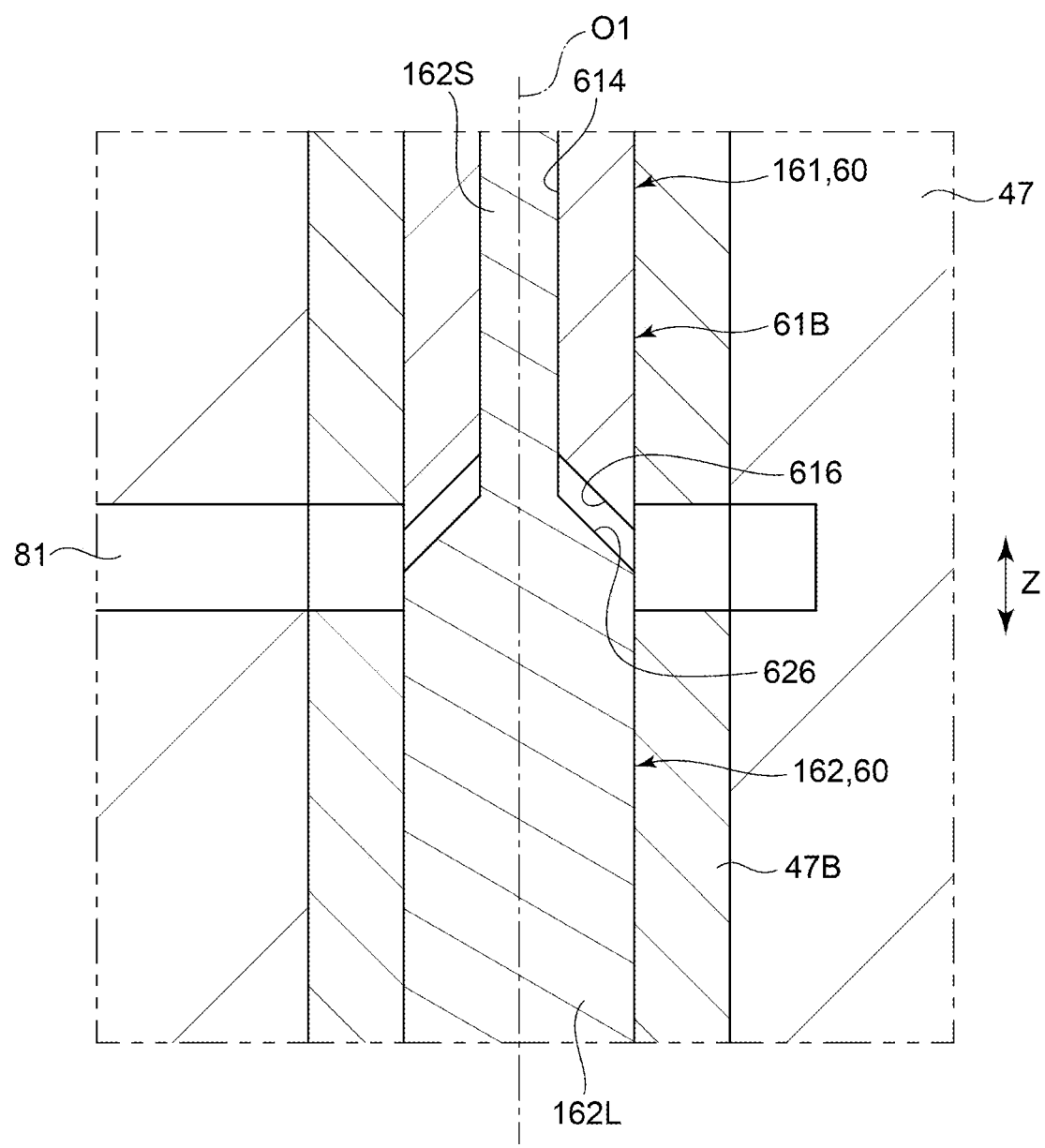
FIG. 7A is an enlarged view of a region D in FIG. 5.
Figure 7B:
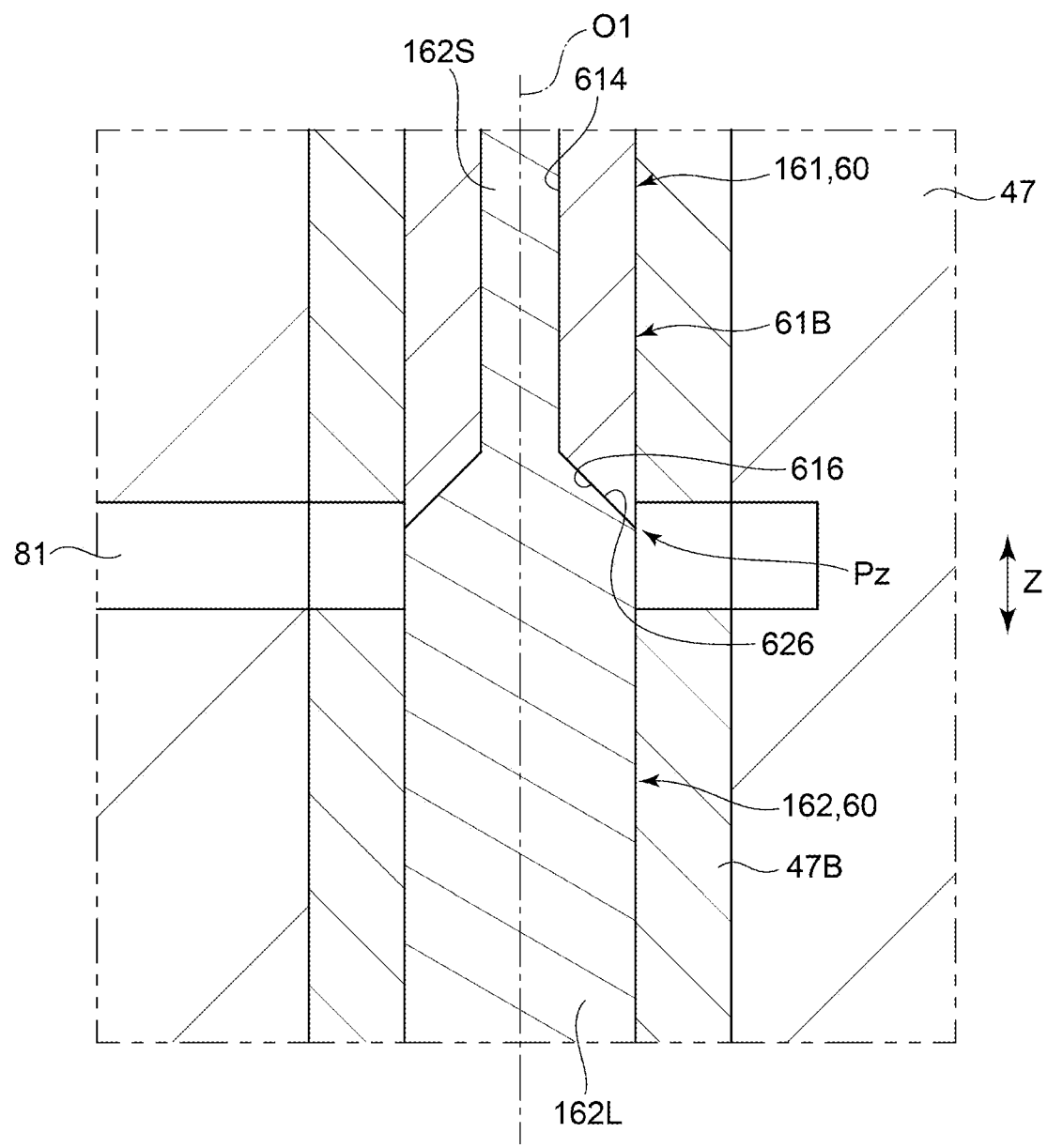
FIG. 7B is an enlarged view of the region D in FIG. 5.
Figure 8A:
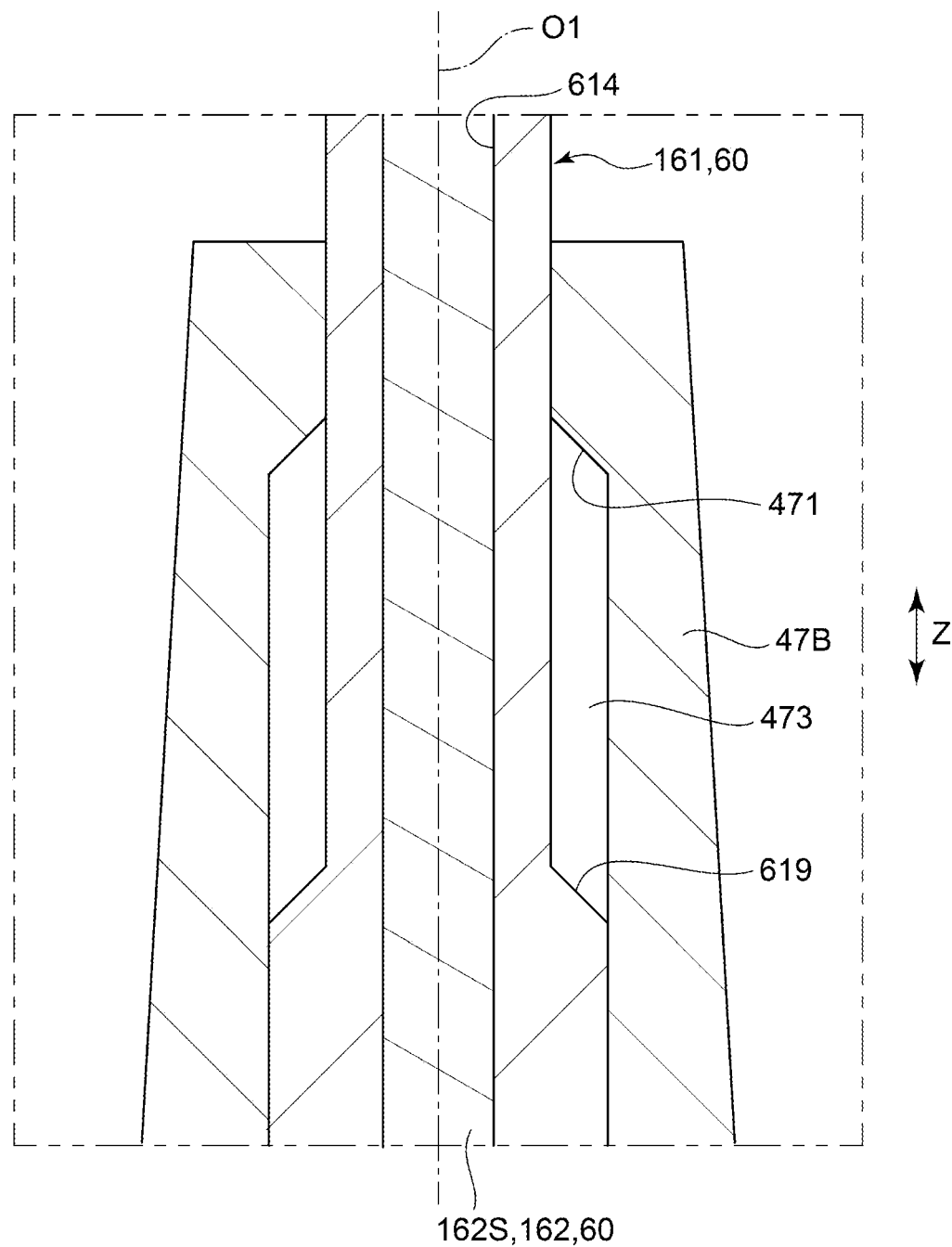
FIG. 8A is an enlarged view of a region E in FIG. 5.
Figure 8B:
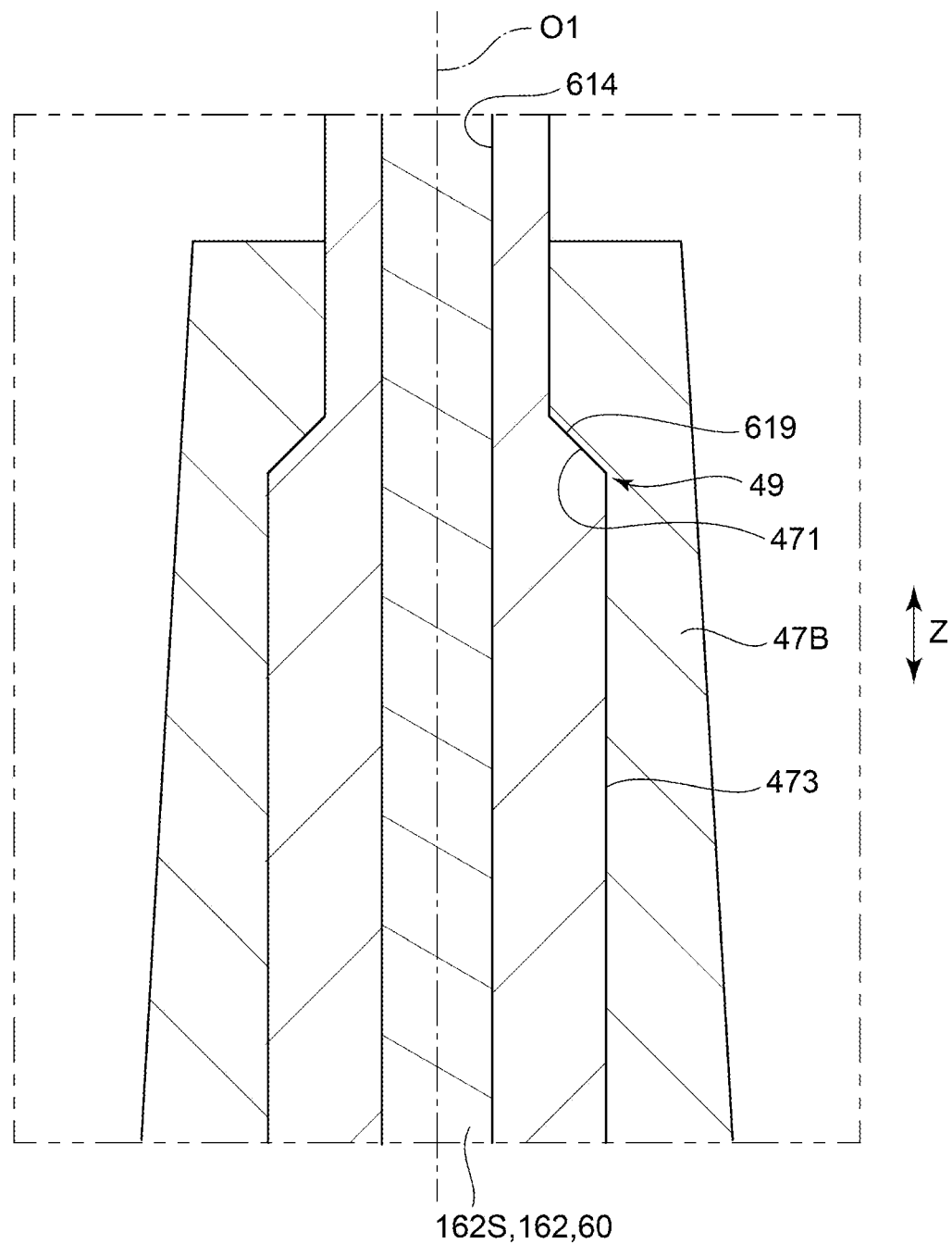
FIG. 8B is an enlarged view of the region E in FIG. 5.

Next, the configuration of the steam valve 14 according to the second embodiment will be described with reference to FIGS. 5 to 8B. FIG. 5 is a cross-sectional view showing the configuration of the steam valve 14 in a state where both a first valve disc 171 and a second valve disc 172 are closed according to the second embodiment. FIGS. 6A and 6B are each an enlarged view of a region C in FIG. 5. FIGS. 7A and 7B are each an enlarged view of a region D in FIG. 5. FIGS. 8A and 8B are each an enlarged view of a region E in FIG. 5. FIGS. 6A, 7A, and 8A show the state when the stop valve 45 is fully closed. FIG. 6B shows the open state of the second valve disc 172. FIG. 7B shows a state where the stop valve 45 starts to open from when the stop valve 45 is fully closed and the second valve stem 162 starts to drive the first valve stem 161. FIG. 8B shows the state when the stop valve 45 is fully open.

In the following description, the same components as those of the steam valve 14 according to the first embodiment are given the same reference signs as those of the steam valve 14 according to the first embodiment, and detailed descriptions thereof may be omitted.

In the steam valve 14 according to the second embodiment, the first valve disc 171 forming the stop valve 45 and the distal end 56A of the control valve body 56 forming the control valve 43 can abut against the valve seat surface 48a.

In the steam valve 14 according to the second embodiment, the configuration of the control valve 43 is the same as that of the steam valve 14 according to the first embodiment.

(Stop Valve 45)

The stop valve 45 is disposed on the inner side of the control valve 43 as with the steam valve 14 according to the first embodiment. The stop valve 45 includes the valve stem 60, the first valve disc 171, and the second valve disc 172.

(Valve Stem 60)

The valve stem 60 extends in the axial direction Z, and has the distal end part 61A and the rod-shaped part 60B on the proximal end side relative to the distal end part 60A. The distal end part 61A has a shape that can engage with the first valve disc 171, for fixing the first valve disc 171. The rod-shaped part 60B extends along the axial direction Z. The rod-shaped part 60B has a proximal end portion connected to the actuator 46B. Thus, the valve stem 60 having the distal end part 61A and the rod-shaped part 60B is partitioned into a first valve stem 161 and a second valve stem 162 as will be described in detail later, and the first valve stem 161 and the second valve stem 162 are movable back and forth in the axial direction Z.

In the steam valve 14 according to the second embodiment, the first valve stem 161 is a hollow valve stem located on the distal end side of the valve stem 60 partitioned into two parts relative to the partition position in the axial direction Z, and the first valve disc 171 is fixed to the distal end part 61A.

The first valve stem 161 has a valve stem insertion hole 614 which penetrates from the proximal end to the distal end of the first valve stem 161 and through which a later-described small diameter section 162S of the second valve stem 162 is inserted.

In the examples shown in FIGS. 5, 6A, and 6B, the distal end of the first valve stem 161 and the surface of the first valve disc 171 on the proximal end side are connected, but the first valve stem 161 may penetrate the first valve disc 171 in the axial direction Z.

In the steam valve 14 according to the second embodiment, the second valve stem 162 has a large diameter section 162L located on the proximal end side of the valve stem 60 partitioned into two parts relative to the partition position in the axial direction Z, and the small diameter section 162S located on the distal end side relative to the partition position in the axial direction Z and having a smaller diameter than the large diameter section 162L.

The small diameter section 162S is inserted through the valve stem insertion hole 614 of the first valve stem 161. A distal end portion 162a of the small diameter section 162S protrudes to the distal end side from surfaces of the first valve stem 161 and the first valve disc 171 on the distal end side, and the second valve disc 172 is fixed to the distal end portion 162a of the small diameter section 162S.

The proximal end part 62B of the second valve stem 162 is connected to the actuator 46B.

In the steam valve 14 according to the second embodiment, the first valve stem 161 and the second valve stem 162 are configured to relatively be movable in the axial direction Z. That is, the small diameter section 162S of the second valve stem 162 is slidably inserted in the axial direction Z through the valve stem insertion hole 614 of the first valve stem 161 covering an outer periphery of the small diameter section 162S.

As shown in FIG. 7A, in the steam valve 14 according to the second embodiment, the first valve stem 161 has a first valve-open-time pressing surface 616 pressed in the axial direction Z with the second valve stem 162 when the second valve stem 162 moves from the proximal end side toward the distal end side of the valve stem 60.

In the steam valve 14 according to the second embodiment, the second valve stem 162 has a second valve-open-time pressing surface 626 pressing the first valve-open-time pressing surface 616 in the axial direction Z when the second valve stem 162 moves from the proximal end side toward the distal end side of the valve stem 60.

In the steam valve 14 according to the second embodiment, the first valve-open-time pressing surface 616 is a conical inclined surface which is formed on the proximal end part 61B of the first valve stem 161 and, for example, expands the inner diameter of the inner peripheral surface of the first valve stem 161 from the distal end side toward the proximal end side of the valve stem 60.

In the steam valve 14 according to the second embodiment, the second valve-open-time pressing surface 626 is a conical inclined surface which is formed at a distal end of the large diameter section 162L and, for example, expands an outer diameter from the proximal end side toward the distal end side of the valve stem 60.

As shown in FIG. 7B, the first valve-open-time pressing surface 616 and the second valve-open-time pressing surface 626 are formed to be abuttable against each other. The first valve-open-time pressing surface 616 and the second valve-open-time pressing surface 626 may each be a spherical inclined surface instead of the conical inclined surface.

In the steam valve 14 according to the second embodiment, the partition position Pz of the first valve stem 161 and the second valve stem 162 in the axial direction Z is the abutment position of the first valve-open-time pressing surface 616 and the second valve-open-time pressing surface 626.

(First Valve Disc 171 and Second Valve Disc 172)

In the steam valve 14 according to the second embodiment, the first valve stem 161 and the second valve stem 162 are configured to relatively be movable in the axial direction Z. Therefore, the first valve disc 171 fixed to the first valve stem 161 and the second valve disc 172 fixed to the second valve disc 172 are configured to relatively be movable in the axial direction Z.

As shown in FIGS. 6A and 6B, in the steam valve 14 according to the second embodiment, the first valve disc 171 has a valve seat surface 74 which is formed on the surface of the first valve disc 171 on the distal end side and against which the second valve disc 172 is abuttable.

In the steam valve 14 according to the second embodiment, the first valve disc 171 has a first valve disc through hole 75 penetrating the first valve disc 171 in the axial direction Z. An opening 75a of the first valve disc through hole 75 on the distal end side faces the steam flow path 52 on the upstream side of the first valve disc 171. An opening 75b of the first valve disc through hole 75 on the proximal end side faces the steam flow path 52 on the downstream side of the first valve disc 171.

As shown in FIGS. 6A and 6B, in the steam valve 14 according to the second embodiment, the second valve disc 172 has an abutment part 77 which is abuttable against the valve seat surface 74 of the first valve disc 171. The abutment part 77 is formed into a ring shape when viewed from the axial direction Z.

The opening 75a of the first valve disc through hole 75 on the distal end side is formed on a radially inner side centered on the axis O1 of the valve stem 60 relative to the abutment part 77. Therefore, in the state where the second valve disc 172 is closed, that is, if the abutment part 77 abuts against and closely contacts the valve seat surface 74 of the first valve disc 171, since the state is entered where the opening 75a of the first valve disc through hole 75 on the distal end side is separated from the steam flow path 52 through which high-pressure steam flows, no high-pressure steam flows through the first valve disc through hole 75.

For example, in the case where the second valve stem 62 is driven toward the distal end side by the actuator 46B and the second valve stem 62 presses the first valve stem 61 toward the distal end side or in the state when the stop valve 45 is fully open, the first valve stem 61 and the second valve stem 62 move relatively in the axial direction Z so as to approach each other, the first valve-open-time pressing surface 616 and the second valve-open-time pressing surface 613 abut against each other as shown in FIG. 7B, and the valve seat surface 74 of the first valve disc 171 and the abutment part 77 of the second valve disc 172 are separated from each other as shown in FIG. 6B.

For example, in the case where the second valve stem 62 is driven toward the proximal end side by the actuator 46B or in the state when the stop valve 45 is fully closed as shown in FIGS. 6A, 7A, and 8A, the first valve stem 61 and the second valve stem 62 move relatively in the axial direction Z so as to get farther away from each other, the first valve-open-time pressing surface 616 and the second valve-open-time pressing surface 626 are separated from each other, and the valve seat surface 74 of the first valve disc 171 and the abutment part 77 of the second valve disc 172 abut against and closely contact each other.

The driving force by which the actuator 46B drives the second valve stem 162 toward the proximal end side is transmitted to the first valve disc 171 and the first valve stem 161 by pressing the valve seat surface 74 of the first valve disc 171 toward the proximal end side with the abutment part 77 of the second valve disc 172.

For example, in the case where the second valve stem 162 starts to be driven toward the distal end side by the actuator 46B from the state when the stop valve 45 is fully closed, as shown in FIG. 6B, the valve seat surface 74 of the first valve disc 171 and the abutment part 77 of the second valve disc 172 are separated from each other.

(First Inclined Surface 619 of First Valve Stem 61)

As shown in FIGS. 8A and 8B, in the steam valve 14 according to the second embodiment, the first valve stem 161 has a first inclined surface 619 which expands the outer diameter of the valve stem 60 (first valve stem 161) from the distal end side toward the proximal end side of the valve stem 60, on the distal end side in the region where the outer peripheral surface is covered with the second guide member 47B. The first inclined surface 619 is a conical inclined surface.

In the steam valve 14 according to the second embodiment, the second guide member 47B has the first abutment surface 471 abutting against the first inclined surface 619 of the first valve stem 161 when the stop valve 45 is fully open as shown in FIG. 8B. The first abutment surface 471 is a conical inclined surface formed so as to expand an inner diameter of the first abutment surface 471 from the distal end side toward the proximal end side.

The first inclined surface 619 and the first abutment surface 471 are formed to be abuttable against each other without any gap. The first inclined surface 619 and the first abutment surface 471 may each be a spherical inclined surface instead of the conical inclined surface.

Regarding Operation of Stop Valve 45 of Steam Valve 14 According to Second Embodiment In the steam valve 14 according to the second embodiment, the stop valve 45 operates as follows.

In the steam valve 14, the stop valve 45 is opened before the control valve 43 is opened when the flow rate of steam is controlled by the control valve 43.

(When Fully Closed)

When the stop valve 45 is fully closed as shown in FIG. 5, the first valve disc 71 abuts against the valve seat surface 48a of the valve seat 48. Therefore, the first valve stem 61 to which the first valve disc 71 is fixed is restricted from moving toward the proximal end side. The second valve stem 62 is biased toward the proximal end side by a biasing force of a closing spring (not shown). Consequently, the first valve stem 61 and the second valve stem 62 move relatively in the axial direction Z so as to get farther away from each other, the first valve-open-time pressing surface 616 and the second valve-open-time pressing surface 613 are separated from each other as shown in FIG. 3B, and the valve seat surface 74 of the first valve disc 171 and the abutment part 77 of the second valve disc 172 abut against and closely contact each other.

In the state where the second valve disc 172 is closed, that is, if the abutment part 77 abuts against and closely contacts the valve seat surface 74 of the first valve disc 171, as described above, since the state is entered where the opening 75a of the first valve disc through hole 75 on the distal end side is separated from the steam flow path 52 through which high-pressure steam flows, no high-pressure steam flows through the first valve disc through hole 75.

(Case where Stop Valve 45 Starts to Open from Fully Closed State)

In the state where the second valve stem 162 starts to be driven toward the distal end side by the actuator 46B from the fully closed state of the stop valve 45 shown in FIGS. 6A, 7A, and 8A, the valve seat surface 74 of the first valve disc 171 and the abutment part 77 of the second valve disc 172 are separated from each other as shown in FIG. 6B while the first valve disc 171 remains closed. Consequently, high-pressure steam flows into the opening 75a of the first valve disc through hole 75 on the distal end side from the clearance between the valve seat surface 74 and the abutment part 77. The high-pressure steam having flowed into the opening 75a of the first valve disc through hole 75 on the distal end side is led out to the steam flow path 52 from the opening 75b of the first valve disc through hole 75 on the proximal end side. Whereby, a differential pressure between the upstream and downstream sides of the first valve disc 171 is reduced, facilitating a subsequent opening operation of the first valve disc 171.

(From Start of Opening to Fully Open State of Stop Valve 45)

If the second valve stem 162 is further driven toward the distal end side by the actuator 46B from the above-described state where the stop valve 45 starts to open, the first valve-open-time pressing surface 616 and the second valve-open-time pressing surface 626 abut against each other as shown in FIG. 7B. Therefore, if the second valve stem 162 is further driven toward the distal end side by the actuator 46B, the first valve stem 161 is driven toward the distal end side by a driving force of the actuator 46B transmitted via the second valve stem 162. Consequently, the first valve disc 171 fixed to the first valve stem 161 moves to the distal end side and leaves the valve seat surface 48a of the valve seat 48.

(When Fully Open)

If the second valve stem 162 is further driven toward the distal end side by the actuator 46B, the stop valve 45 enters the fully open state.

In the fully open state of the stop valve 45, the first inclined surface 619 of the first valve stem 161 abuts against the first abutment surface 471 of the second guide member 47B without any gap as shown in FIG. 8B. Consequently, the first valve stem 161 and the first valve disc 171 are restricted from moving to the distal end side. Further, the first valve stem 161 is biased to the distal end side by the driving force of the actuator 46B. Therefore, the first inclined surface 619 and the first abutment surface 471 are brought into pressure-contact with each other in the state where the first inclined surface 619 and the first abutment surface 471 abut against each other without any gap. Consequently, the pressure boundary 49 is formed by the first inclined surface 619 and the first abutment surface 471. The pressure boundary 49 divides the steam flow path 52 from the inner peripheral portion 473 of the second guide member 47B in terms of pressure.

(During Closing Operation)

In the case where the stop valve 45 is closed, if the second valve stem 162 is driven toward the proximal end side by the actuator 46B, the first valve stem 161 and the second valve stem 162 move relatively in the axial direction Z so as to get farther away from each other, the first valve-open-time pressing surface 616 and the second valve-open-time pressing surface 626 are separated from each other, and the valve seat surface 74 of the first valve disc 71 and the abutment part 77 of the second valve disc 172 abut against each other.

Therefore, if the second valve stem 62 is further driven toward the proximal end side by the actuator 46B, the first valve stem 61 and the first valve disc 71 start to move toward the proximal end side.

Hereinafter, the first valve stem 161 and the first valve disc 171 move toward the proximal end side until the first valve disc 171 abuts against the valve seat surface 48a of the valve seat 48.

Thus, in the steam valve 14 according to the second embodiment, the partition position Pz of the first valve stem 161 and the second valve stem 162 in the axial direction Z is located outside the pressure boundary 49 divided from the steam flow path 52 in terms of pressure.

In the steam valve 14 according to the second embodiment, wear does not occur between the first valve disc 171 and the first valve stem 161 since the first valve disc 171 is fixed to the first valve stem 161, and the partition position Pz of the first valve stem 161 and the second valve stem 162 in the axial direction is not exposed to the steam flow path 52, where high-pressure steam may flow at high speed, since the partition position Pz is located outside the pressure boundary 49, effectively suppressing wear at the partition position Pz.

In the steam valve 14 according to the second embodiment, the pressure boundary 49 is formed by the first inclined surface 619 and the first abutment surface 471.

Whereby, the pressure boundary 49 can be formed by using the configuration for limiting the movement range of the valve stem 60 toward the distal end side, making it possible to simplify the configuration of the steam valve 14.

In the steam valve 14 according to the second embodiment, the first abutment surface 471 is formed in the second guide member 47B which is a cylindrical support member for slidably supporting the valve stem 60.

Whereby, the pressure boundary 49 can be formed by the second guide member 47B which is the support member for the valve stem and the valve stem 60 (first valve stem 161).

In the steam valve 14 according to the second embodiment, the first valve stem 161 has the first valve-open-time pressing surface 616 and the second valve stem 162 has the second valve-open-time pressing surface 626.

Whereby, even if the valve stem 60 is partitioned into the first valve stem 161 and the second valve stem 162, the second valve stem 162 can move the first valve stem 161 from the proximal end side toward the distal end side of the valve stem 60.

In the steam valve 14 according to the second embodiment, the first valve stem 161 is interposed between the first abutment surface 471 of the second guide member 47B and the second valve-open-time pressing surface 626 of the second valve stem 162 and is fixed to the second guide member 47B when the stop valve 45 is fully open.

Consequently, the first valve stem 161 and the first valve disc 171 fixed to the first valve stem 161 are fixed to the second guide member 47B when the stop valve 45 is fully open, making it possible to suppress vibrations of the first valve stem 161 and the first valve disc 171. Further, since the first valve stem 161 is fixed to the second guide member 47B, it is possible to effectively suppress wear at the contact area of the first valve stem 161 and the second guide member 47B.

In the steam valve 14 according to the second embodiment, the stop valve 45 includes the second valve disc 172 fixed to the distal end portion 162a of the second valve stem 162. The first valve disc 171 functions as a valve seat of the second valve disc 172, and is formed with the first valve disc through hole 75 into which steam flows when the second valve disc 172 is opened.

Whereby, since the second valve disc 172 is opened, the pressure of the steam acting on the stop valve 45 can be reduced by releasing the steam acting on the stop valve 45 to the outside via the first valve disc through hole 75. That is, the differential pressure between the upstream and downstream sides of the first valve disc 71 is reduced, facilitating the opening operation of the first valve disc 71.

Further, in the steam valve 14 according to the second embodiment, since the second valve stem 162 and the second valve disc 172 are fixed, no wear occurs between the second valve disc 172 and the second valve stem 162.

In the steam valve 14 according to the second embodiment, since the first valve disc through hole 75 is formed in the first valve disc 171, the differential pressure between the upstream and downstream sides of the first valve disc 171 can effectively be reduced even if the amount of steam leaking from the clearance between the control valve 43 and the valve seat 48 is relatively large.

In the steam valve 14 according to the second embodiment, the first valve disc 171 is configured to be pressed from the distal end side toward the proximal end side of the valve stem 60 by the second valve disc 172 and to move together with the first valve stem 161 from the distal end side toward the proximal end side of the valve stem 60, when the second valve stem 162 moves from the distal end side toward the proximal end side of the valve stem 60.

Whereby, the first valve disc 171 and the first valve stem 161 can be moved by the second valve disc 172 from the distal end side toward the proximal end side of the valve stem 60.

Further, in the steam valve 14 according to the second embodiment, since the first valve disc 171 is interposed and fixed between the second valve disc 172 and the valve seat 48 of the valve body 41 when the stop valve 45 is fully closed, it is possible to effectively prevent steam from leaking from between the first valve disc 171 and the valve seat 48 of the valve body 41.

In the steam valve 14 according to the second embodiment, a length where the first valve stem 161 and the small diameter section 162S of the second valve stem 162 overlap in the axial direction Z has a relatively large room for choice from a functional point of view, facilitating optimization from viewpoints of wear soundness of the stop valve 45, vibration soundness of the stop valve 45, and drive soundness of the stop valve 45.

The position in the axial direction Z where the first valve-open-time pressing surface 616 and the second valve-open-time pressing surface 626 are disposed may not necessarily be in the vicinity of a system for recovering leaked steam, such as the high-pressure stem leak system 81. For example, if it is configured such that steam does not leak to the outside of the steam valve 14 from between the first valve-open-time pressing surface 616 and the second valve-open-time pressing surface 626, the first valve-open-time pressing surface 616 and the second valve-open pressing surface 626 may be located in an atmospheric opening section. That is, if it is configured such that steam does not leak to the outside of the steam valve 14 from between the first valve-open-time pressing surface 616 and the second valve-open-time pressing surface 626, the length where the first valve stem 161 and the small diameter section 162S of the second valve stem 162 overlap in the axial direction Z may be any length.

In the steam valve 14 according to the second embodiment, the pressure boundary 49 is formed by the first inclined surface 619 and the first abutment surface 471. Therefore, the clearance between the inner diameter of the valve stem insertion hole 614 of the first valve stem 161 and the outer diameter of the small diameter section 162S of the second valve stem 162 can be made relatively large, and drive soundness such as suppression of stick-slip is kept easily.

The steam valve 14 according to some embodiments described above includes the control valve 43 which is disposed facing the stop valve 45 and is abuttable against the valve seat 48 at a position on an outer side of a position where the first valve disc 71, 171 is abutted against the valve seat 48, in the axial direction Z.

Whereby, in the steam valve 14 in which the control valve 43 is disposed outside the stop valve 45, it is possible to effectively suppress the occurrence of the wear in the steam valve 14.

The power generation system 1 according to an embodiment includes the steam valve 14 according to some embodiments described above, the boiler 11 for generating steam, the steam turbine 10 driven by steam, and the steam supply pipe (first steam supply pipe 12) for connecting the boiler 11 and the steam turbine 10 and supplying steam to the steam turbine 10. The steam valve 14 according to some embodiments is disposed in the steam supply pipe (first steam supply pipe 12).

Whereby, since the power generation system 1 includes the steam valve 14 capable of suppressing the wear of the stop valve 45, it is possible to reduce the maintenance frequency of the steam valve 14, making it possible to improve operating efficiency of the power generation system 1.

The present disclosure is not limited to the above-described embodiments, and also includes an embodiment obtained by modifying the above-described embodiments or an embodiment obtained by combining these embodiments as appropriate.

For example, in some embodiments described above, the second guide member 47B may not protrude into the steam flow path 52.

Further, in some embodiments described above, the first abutment surface 471 abutting against the first inclined surface 619 of the first valve stem 61, 161 when the stop valve 45 is fully open may be disposed on a member other than the second guide member 47B, for example, the flow path dividing part 47 (valve casing) or a through bush mounted on the flow path dividing part 47.

The contents described in the above embodiments would be understood as follows, for instance.

(1) A steam valve 14 according to at least one embodiment of the present disclosure, includes: a valve body 41 that includes a steam flow path 52 through which steam flows, and a valve seat 48 disposed in the middle of the steam flow path 52 and having an opening portion; and a stop valve 45 that includes a valve stem 60 which extends in an axial direction Z, where an axis O1, O2 extends, and is movable back and forth in the axial direction Z, and a first valve disc 71, 171 which is fixed to a distal end part 60A of the valve stem 60 and is abutted against the valve seat 48 to close the steam flow path 52. The valve stem 60 is partitioned into a first valve stem 61, 161 to which the first valve disc 71, 171 is fixed and a second valve stem 62, 162 different from the first valve stem 61, 161. A partition position Pz of the first valve stem 61, 161 and the second valve stem 62, 162 in the axial direction Z is located outside a pressure boundary 49 divided from the steam flow path 52 in terms of pressure.

With the above configuration (1), wear does not occur between the first valve disc 71, 171 and the first valve stem 161 since the first valve disc 71, 171 is fixed to the first valve stem 61, 161, and the partition position Pz of the first valve stem 61, 161 and the second valve stem 62, 162 in the axial direction Z is not exposed to the steam flow path 52, where high-pressure steam may flow at high speed, since the partition position Pz is located outside the pressure boundary 49, effectively suppressing wear at the partition position Pz.

(2) In some embodiments, in the above configuration (1), the valve stem 60 preferably has a first inclined surface 619 which expands an outer diameter of the valve stem 60 from a distal end side toward a proximal end side of the valve stem 60. The steam valve 14 according to at least one embodiment of the present disclosure preferably includes a counterpart member (second guide member 47B) which has a first abutment surface 471 abutting against the first inclined surface 619 when the stop valve 45 is fully open. The above-described pressure boundary 49 is preferably formed by the first inclined surface 619 and the first abutment surface 471.

With the above configuration (2), the pressure boundary 49 can be formed by using the configuration for limiting the movement range of the valve stem 60 toward the distal end side, making it possible to simplify the configuration of the steam valve 14.

(3) In some embodiments, in the above configuration (2), the counterpart member (second guide member 47B) may be a cylindrical support member (second guide member 47B) for slidably supporting the valve stem 60.

With the above configuration (3), the pressure boundary 49 can be formed by the support member (second guide member 47B) for the valve stem 60 and the valve stem 60.

(4) In some embodiments, in the above configuration (2) or (3), the first valve stem 61, 161 preferably has a first valve-open-time pressing surface 613, 616 pressed in the axial direction Z with the second valve stem 62, 162 when the second valve stem 62, 162 moves from the proximal end side toward the distal end side of the valve stem 60. The second valve stem 62, 162 preferably has a second valve-open-time pressing surface 623, 626 pressing the first valve-open-time pressing surface 613, 616 in the axial direction when the second valve stem 62, 162 moves from the proximal end side toward the distal end side of the valve stem 60.

With the above configuration (4), even if the valve stem 60 is partitioned into the first valve stem 61, 161 and the second valve stem 62, 162, the second valve stem 62, 162 can move the first valve stem 61, 161 from the proximal end side toward the distal end side of the valve stem 60.

(5) In some embodiments, in the above configuration (4), the first valve stem 61, 161 is preferably interposed between the first abutment surface 471 and the second valve-open-time pressing surface 623, 626 and is fixed to the counterpart member (second guide member 47B) when the stop valve 45 is fully open With the above configuration (5), since the first valve stem 61, 161 and the first valve disc 71, 171 fixed to the first valve stem 61, 161 are fixed to the counterpart member (second guide member 47B) when the stop valve 45 is fully open, it is possible to suppress vibrations of the first valve stem 61, 161 and the first valve disc 71, 171. Further, since the first valve stem 61, 161 is fixed to the counterpart member (second guide member 47B), it is possible to effectively suppress wear at the contact area of the first valve stem 61, 161 and the counterpart member (second guide member 47B).

(6) In some embodiments, in the above configuration (4) or (5), the first valve stem 61 preferably has a through hole 617 penetrating from a distal end to a proximal end of the first valve stem 61. It is preferable that the first valve-open-time pressing surface 613 and the second valve-open-time pressing surface 623 abut against each other to prohibit the steam in the steam flow path 52 from flowing out to an outside via the through hole 617, when the stop valve 45 is fully open.

With the above configuration (6), since it is configured such that the steam in the above-described through hole 617 can be released to the outside when the stop valve 45 starts to open from the fully closed state, the pressure of the steam acting on the stop valve 45 can be reduced by releasing the steam acting on the stop valve 45 to the outside via the above-described through hole 617. Further, with the above configuration (6), it is possible to prohibit the steam from flowing out to the outside via the through hole 617 when the stop valve 45 is fully open.

(7) In some embodiments, in any of the above configurations (4) to (6), the first valve stem 61 preferably has a first valve-close-time pressing surface 615 pressed in the axial direction Z with the second valve stem 62 when the stop valve 45 is fully closed. The second valve stem 62 preferably has a second valve-close-time pressing surface 625 pressing the first valve-close-time pressing surface 615 in the axial direction when the stop valve 45 is fully closed.

With the above configuration (7), even if the valve stem 60 is partitioned into the first valve stem 61 and the second valve stem 62, the second valve stem 62 can move the first valve stem 61 from the distal end side toward the proximal end side of the valve stem 60.

(8) In some embodiments, in the above configuration (7), the first valve stem 61 preferably has a through hole 617 penetrating from a distal end to a proximal end of the first valve stem 61. It is preferable that the first valve-close-time pressing surface 615 and the second valve-close-time pressing surface 625 abut against each other to prohibit the steam in the steam flow path 52 from flowing out to an outside via the through hole 617, when the stop valve 45 is fully closed.

With the above configuration (8), since it is configured such that the steam in the above-described through hole 617 can be released to the outside when the stop valve 45 starts to open from the fully closed state, the pressure of the steam acting on the stop valve 45 can be reduced by releasing the steam acting on the stop valve 45 to the outside via the above-described through hole 617. Further, with the above configuration (8), it is possible to prohibit the steam from flowing out to the outside via the through hole 617 when the stop valve 45 is fully closed.

(9) In some embodiments, in the above configuration (8), it is preferable that the first valve-open-time pressing surface 613 and the second valve-open-time pressing surface 623 abut against each other to prohibit the steam in the steam flow path 52 from flowing out to the outside via the through hole 617, when the stop valve 45 is fully open. It is preferable that the first valve-close-time pressing surface 615 and the second valve-close-time pressing surface 625 are separated from each other and the first valve-open-time pressing surface 613 and the second valve-open-time pressing surface 623 are separated from each other to permit the steam in the steam flow path 52 to flow out to the outside via the through hole 617, when the stop valve 45 starts to open from when the stop valve 45 is fully closed.

With the above configuration (9), the pressure of the steam acting on the stop valve 45 can be reduced by releasing the steam acting on the stop valve 45 to the outside via the through hole 617, when the stop valve 45 starts to open from when the stop valve 45 is fully closed. Further, with the above configuration (9), it is possible to prohibit the steam from flowing out to the outside via the through hole 617 when the stop valve 45 is fully open.

(10) In some embodiments, in any of the above configurations (1) to (5), the first valve stem 161 preferably has a valve stem insertion hole 614 which penetrates from a proximal end to a distal end of the first valve stem 161 and through which the second valve stem 162 (small diameter section 162S) is inserted. The second valve stem 162 (small diameter section 162S) is preferably inserted through the valve stem insertion hole 614. The stop valve 45 preferably includes a second valve disc 172 fixed to a distal end portion 162a of the second valve stem 162. It is preferable that the first valve disc 171 functions as a valve seat of the second valve disc 172, and is formed with a first valve disc through hole 75 into which the steam flows when the second valve disc 172 is opened.

With the above configuration (10), since the second valve disc 172 is opened, the pressure of the steam acting on the stop valve 45 can be reduced by releasing the steam acting on the stop valve 45 to the outside via the first valve disc through hole 75. Further, with the above configuration (10), since the second valve stem 162 and the second valve disc 172 are fixed, no wear occurs between the second valve disc 172 and the second valve stem 162.

(11) In some embodiments, in the above configuration (10), it is preferably configured such that the first valve disc 171 is pressed from a distal end side toward a proximal end side of the valve stem 60 by the second valve disc 172 and moves together with the first valve stem 161 from the distal end side toward the proximal end side of the valve stem 60, when the second valve stem 162 moves from the distal end side toward the proximal end side of the valve stem 60.

With the above configuration (11), the first valve disc 171 and the first valve stem 161 can be moved by the second valve disc 172 from the distal end side toward the proximal end side of the valve stem 60. Further, with the above configuration (11), since the first valve disc 171 is interposed and fixed between the second valve disc 172 and the valve seat 48 of the valve body 41 when the stop valve 45 is fully closed, it is possible to effectively prevent steam from leaking from between the first valve disc 171 and the valve seat 48 of the valve body 41.

(12) In some embodiments, in any of the above configurations (1) to (11), the steam valve 14 preferably includes a control valve 43 which is disposed facing the stop valve 45 and is abuttable against the valve seat 48 at a position on an outer side of a position where the first valve disc 71, 171 is abutted against the valve seat 48, in the axial direction Z.

With the above configuration (12), in the steam valve 14 in which the control valve 43 is disposed outside the stop valve 45, it is possible to effectively suppress the occurrence of the wear in the steam valve 14.

(13) A power generation system 1 according to at least one embodiment of the present disclosure, includes: the steam valve 14 having any of the above configurations (1) to (12); a boiler 11 for generating steam; a steam turbine 10 driven by the steam; and a steam supply pipe (first steam supply pipe 12) for connecting the boiler 11 and the steam turbine 10 and supplying the steam to the steam turbine 10. The steam valve 14 is disposed in the steam supply pipe (first steam supply pipe 12).

With the above configuration (13), since the power generation system 1 includes the steam valve 14 capable of suppressing the wear of the stop valve 45, it is possible to reduce the maintenance frequency of the steam valve 14, making it possible to improve operating efficiency of the power generation system 1.

REFERENCE SIGNS LIST

1 Power generation system
10 Steam turbine
11 Boiler
12 First steam supply pipe
14 Steam valve
41 Valve body
43 Control valve
45 Stop valve
47A First guide member
47B Second guide member
48 Valve seat
52 Steam flow path
60 Valve stem
61, 161 First valve stem
62, 162 Second valve stem
71, 171 First valve disc
75 First valve disc through hole
172 Second valve disc
471 First abutment surface
610a Distal end
610b Proximal end
613, 616 First valve-open-time pressing surface
614 Valve stem insertion hole
615 First valve-close-time pressing surface
617 Through hole
619 First inclined surface
623, 626 Second valve-open-time pressing surface
625 Second valve-close-time pressing surface

The invention claimed is:
1. A steam valve, comprising:
a valve body that includes a steam flow path through which steam flows, and a valve seat disposed in the middle of the steam flow path and having an opening portion; and
a stop valve that includes a valve stem which extends in an axial direction, where an axis extends, and is movable back and forth in the axial direction, and a first valve disc which is fixed to a distal end part of the valve stem and is abutted against the valve seat to close the steam flow path,
wherein the valve stem is partitioned into a first valve stem to which the first valve disc is fixed and a second valve stem different from the first valve stem,
wherein a partition position of the first valve stem and the second valve stem in the axial direction is located outside a pressure boundary divided from the steam flow path in terms of pressure, wherein the valve stem has a first inclined surface which expands an outer diameter of the valve stem from a distal end side toward a proximal end side of the valve stem, wherein the steam valve includes a counterpart member which has a first abutment surface abutting against the first inclined surface when the stop valve is fully open, wherein the pressure boundary is formed by the first inclined surface and the first abutment surface, wherein the first valve stem has a first valve-open-time pressing surface pressed in the axial direction with the second valve stem when the second valve stem moves from the proximal end side toward the distal end side of the valve stem, wherein the second valve stem has a second valve-open-time pressing surface pressing the first valve-open-time pressing surface in the axial direction when the second valve stem moves from the proximal end side toward the distal end side of the valve stem, wherein the first valve stem has a through hole penetrating from a distal end to a proximal end of the first valve stem, and wherein the first valve-open-time pressing surface and the second valve-open-time pressing surface abut against each other to prohibit the steam in the steam flow path from flowing out to an outside via the through hole, when the stop valve is fully open.

2. The steam valve according to claim 1,
wherein the counterpart member is a cylindrical support member for slidably supporting the valve stem.

3. The steam valve according to claim 1,
wherein the first valve stem is interposed between the first abutment surface and the second valve-open-time pressing surface and is fixed to the counterpart member when the stop valve is fully open.

4. The steam valve according to claim 1,
wherein the first valve stem has a first valve-close-time pressing surface pressed in the axial direction with the second valve stem when the stop valve is fully closed, and wherein the second valve stem has a second valve-close-time pressing surface pressing the first valve-close-time pressing surface in the axial direction when the stop valve is fully closed.

5. A steam valve, comprising:
a valve body that includes a steam flow path through which steam flows, and a valve seat disposed in the middle of the steam flow path and having an opening portion; and a stop valve that includes a valve stem which extends in an axial direction, where an axis extends, and is movable back and forth in the axial direction, and a first valve disc which is fixed to a distal end part of the valve stem and is abutted against the valve seat to close the steam flow path, wherein the valve stem is partitioned into a first valve stem to which the first valve disc is fixed and a second valve stem different from the first valve stem, wherein a partition position of the first valve stem and the second valve stem in the axial direction is located outside a pressure boundary divided from the steam flow path in terms of pressure, wherein the valve stem has a first inclined surface which expands an outer diameter of the valve stem from a distal end side toward a proximal end side of the valve stem, wherein the steam valve includes a counterpart member which has a first abutment surface abutting against the first inclined surface when the stop valve is fully open, wherein the pressure boundary is formed by the first inclined surface and the first abutment surface, wherein the first valve stem has a first valve-open-time pressing surface pressed in the axial direction with the second valve stem when the second valve stem moves from the proximal end side toward the distal end side of the valve stem, wherein the second valve stem has a second valve-open-time pressing surface pressing the first valve-open-time pressing surface in the axial direction when the second valve stem moves from the proximal end side toward the distal end side of the valve stem, wherein the first valve stem has a first valve-close-time pressing surface pressed in the axial direction with the second valve stem when the stop valve is fully closed, wherein the second valve stem has a second valve-close-time pressing surface pressing the first valve-close-time pressing surface in the axial direction when the stop valve is fully closed, wherein the first valve stem has a through hole penetrating from a distal end to a proximal end of the first valve stem, and wherein the first valve-close-time pressing surface and the second valve-close-time pressing surface abut against each other to prohibit the steam in the steam flow path from flowing out to an outside via the through hole, when the stop valve is fully closed.

6. The steam valve according to claim 5,
wherein the first valve-open-time pressing surface and the second valve-open-time pressing surface abut against each other to prohibit the steam in the steam flow path from flowing out to the outside via the through hole, when the stop valve is fully open, and wherein the first valve-close-time pressing surface and the second valve-close-time pressing surface are separated from each other and the first valve-open-time pressing surface and the second valve-open-time pressing surface are separated from each other to permit the steam in the steam flow path to flow out to the outside via the through hole, when the stop valve starts to open from when the stop valve is fully closed.

7. The steam valve according to claim 1,
wherein the steam valve includes a control valve which is disposed facing the stop valve and is abuttable against the valve seat at a position on an outer side of a position where the first valve disc is abutted against the valve seat, in the axial direction.

8. A power generation system, comprising:
the steam valve according to claim 1;
a boiler for generating steam;
a steam turbine driven by the steam; and
a steam supply pipe for connecting the boiler and the steam turbine and supplying the steam to the steam turbine,
wherein the steam valve is disposed in the steam supply pipe.

9. A steam valve, comprising:
a valve body that includes a steam flow path through which steam flows, and a valve seat disposed in the middle of the steam flow path and having an opening portion; and a stop valve that includes a valve stem which extends in an axial direction, where an axis extends, and is movable back and forth in the axial direction, and a first valve disc which is fixed to a distal end part of the valve stem and is abutted against the valve seat to close the steam flow path, wherein the valve stem is partitioned into a first valve stem to which the first valve disc is fixed and a second valve stem different from the first valve stem, wherein a partition position of the first valve stem and the second valve stem in the axial direction is located outside a pressure boundary divided from the steam flow path in terms of pressure, wherein the first valve stem has a valve stem insertion hole which penetrates from a proximal end to a distal end of the first valve stem and through which the second valve stem is inserted, wherein the second valve stem is inserted through the valve stem insertion hole, wherein the stop valve includes a second valve disc fixed to a distal end portion of the second valve stem, wherein the first valve disc functions as a valve seat of the second valve disc, and is formed with a first valve disc through hole into which the steam flows when the second valve disc is opened, and wherein the first valve disc is pressed from a distal end side toward a proximal end side of the valve stem by the second valve disc and moves together with the first valve stem from the distal end side toward the proximal end side of the valve stem, when the second valve stem moves from the distal end side toward the proximal end side of the valve stem.

10. The steam valve according to claim 9, wherein the steam valve includes a control valve which is disposed facing the stop valve and is abuttable against the valve seat at a position on an outer side of a position where the first valve disc is abutted against the valve seat, in the axial direction.

11. A power generation system, comprising:

the steam valve according to claim 9;

a boiler for generating steam;

a steam turbine driven by the steam; and a steam supply pipe for connecting the boiler and the steam turbine and supplying the steam to the steam turbine, wherein the steam valve is disposed in the steam supply pipe.

* * * * *